United States Patent
Choi et al.

(10) Patent No.: US 9,967,574 B2
(45) Date of Patent: May 8, 2018

(54) METHOD AND APPARATUS FOR DECODING MULTI-LAYER VIDEO, AND METHOD AND APPARATUS FOR ENCODING MULTI-LAYER VIDEO

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Ho-cheon Wey, Seongnam-si (KR); Jae-won Yoon, Seoul (KR); Jin-young Lee, Hwaseong-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 14/782,535

(22) PCT Filed: Apr. 7, 2014

(86) PCT No.: PCT/KR2014/002995
§ 371 (c)(1),
(2) Date: Oct. 5, 2015

(87) PCT Pub. No.: WO2014/163452
PCT Pub. Date: Oct. 9, 2014

(65) Prior Publication Data
US 2016/0050424 A1 Feb. 18, 2016

Related U.S. Application Data

(60) Provisional application No. 61/808,884, filed on Apr. 5, 2013.

(51) Int. Cl.
*H04N 19/187* (2014.01)
*H04N 19/30* (2014.01)
(Continued)

(52) U.S. Cl.
CPC ......... *H04N 19/187* (2014.11); *H04N 19/172* (2014.11); *H04N 19/29* (2014.11);
(Continued)

(58) Field of Classification Search
CPC .... H04N 19/172; H04N 19/187; H04N 19/29; H04N 19/30; H04N 19/44; H04N 19/70
(Continued)

(56) References Cited

U.S. PATENT DOCUMENTS

| 8,498,337 B2 | 7/2013 | Park et al. |
| 2010/0002762 A1 | 1/2010 | Pandit et al. |

(Continued)

FOREIGN PATENT DOCUMENTS

| CN | 101653000 A | 2/2010 |
| KR | 10-2009-0017460 A | 2/2009 |

(Continued)

OTHER PUBLICATIONS

Hannuksela et al., HEVC v1 scalability hook: long-term pictures with layer_id values, 2013, pp. 1-9.*

(Continued)

*Primary Examiner* — Christopher S Kelley
*Assistant Examiner* — Kathleen Walsh
(74) *Attorney, Agent, or Firm* — Sughrue Mion, PLLC

(57) ABSTRACT

A method of decoding multi-layer video includes decoding a first layer picture, storing the decoded first layer picture in a decoded picture buffer (DPB), and marking the first layer picture as a short-term reference picture; obtaining interlayer reference picture set (RPS) information regarding a second layer picture having a same first picture order count (POC) as the first layer picture; marking the first layer picture, which is marked as the short-term reference picture, as a long-term reference picture, based on the interlayer RPS information; performing interlayer prediction with respect to (Continued)

the second layer picture with reference to the first layer picture; decoding the second layer picture based on a result of performing the interlayer prediction; and, after the second layer picture is decoded, marking the first layer picture, which is marked as the long-term reference picture, as a short-term reference picture.

9 Claims, 28 Drawing Sheets

(51) Int. Cl.
  *H04N 19/70* (2014.01)
  *H04N 19/172* (2014.01)
  *H04N 19/29* (2014.01)
  *H04N 19/44* (2014.01)

(52) U.S. Cl.
  CPC ............ *H04N 19/30* (2014.11); *H04N 19/44* (2014.11); *H04N 19/70* (2014.11)

(58) Field of Classification Search
  USPC .................................................. 375/240.12
  See application file for complete search history.

(56) References Cited

U.S. PATENT DOCUMENTS

| | | | | |
|---|---|---|---|---|
| 2010/0020871 | A1* | 1/2010 | Hannuksela | H04N 21/438 375/240.12 |
| 2013/0208792 | A1* | 8/2013 | He | H04N 19/00569 375/240.12 |
| 2013/0215975 | A1* | 8/2013 | Samuelsson | H04N 19/70 375/240.25 |
| 2013/0243081 | A1* | 9/2013 | Chen | H04N 19/597 375/240.02 |
| 2014/0050270 | A1* | 2/2014 | Lim | H04N 19/31 375/240.25 |
| 2014/0079119 | A1* | 3/2014 | Samuelsson | H04N 19/50 375/240.12 |
| 2014/0169449 | A1* | 6/2014 | Samuelsson | H04N 19/00024 375/240.02 |
| 2014/0218473 | A1* | 8/2014 | Hannuksela | H04N 19/597 348/43 |
| 2014/0254681 | A1* | 9/2014 | Aminlou | H04N 19/105 375/240.16 |
| 2014/0294097 | A1* | 10/2014 | Seregin | H04N 19/00424 375/240.26 |
| 2015/0245063 | A1* | 8/2015 | Rusanovskyy | H04N 19/597 375/240.12 |
| 2017/0238004 | A1 | 8/2017 | Lee et al. | |

FOREIGN PATENT DOCUMENTS

| | | | |
|---|---|---|---|
| WO | 2012/122176 A1 | 9/2012 | |
| WO | 2012/173440 A2 | 12/2012 | |
| WO | 2013/002700 A1 | 1/2013 | |
| WO | WO 2013002700 A1 * | 1/2013 | ............ H04N 19/70 |
| WO | 2014052863 A1 | 4/2014 | |

OTHER PUBLICATIONS

Chen Y et al: "AHG10: Hooks related to motion for the 3DV extension of HEVC", 10th Meeting: Stockholm, SE, Jul. 11-20, 2012, Joint Collaborative Team on Video Coding (JCT-VC) of ITU-T SG16 WP3 and ISO/IEC JTC1/SC29/WG11, Document: JCTVC-J0122, XP030112484 (20 pages total).

Choi B et al: "AHG7: Reference picture marking process for MV-HEVC", 3rd Meeting: Geneva, CH, Jan. 17-23, 2013, Joint Collaborative Team on 3D Video Coding Extension Development of ITU-T SG 16 WP 3 and ISO/IEC JTC 1/SC 29/WG 11, Document: JCT3V-00082, XP030056375, (5 pages total).

Hannuksela M M et al: "HEVC v1 scalability hook: long-term pictures with layer_id values" 12th Meeting: Geneva, CH, Jan. 14-23, 2013, Joint Collaborative Team on Video Coding (JCT-VC) of ITU-T SG 16 WP 3 and ISO/IEC JTC 1/SC 29/WG 11, Document: JCTVC-L0170, XP030056074, (9 pages total).

Tech G et al: "MV-HEVC Draft Text 3 (ISO/IEC 23008-2 PDAM2)", 3rd Meeting: Geneva, CH, Jan. 17-23, 2013, Joint Collaborative Team on 3D Video Coding Extension Development of ITU-T SG 16 WP 3 and ISO/IEC JTC 1/SC 29/WG 11, Document: JCT3V-C1004_d0, XP030056922, (27 pages total).

Communication dated Jul. 11, 2016, issued by the European Patent Office in counterpart European Application No. 14778233.8.

Search Report dated Jul. 9, 2014 issued by the International Searching Authority in counterpart International Application No. PCT/KR2014/002995 (PCT/ISA/210).

Written Opinion dated Jul. 9, 2014 issued by the International Searching Authority in counterpart International Application No. PCT/KR2014/002995 (PCT/ISA/237).

Shen et al.; "Buffer Requirement Analysis and Reference Picture Marking for Temporal Scalable Video Coding"; IEEE; 2007; 8 pages total.

Communication dated Dec. 11, 2017, issued by the State Intellectual Property Office of the People's Republic of China in counterpart Chinese Patent Application No. 201480032588.7.

* cited by examiner

FIG. 7
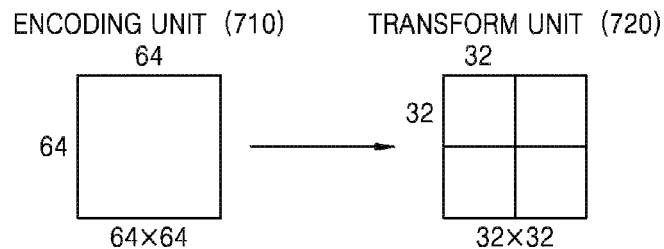
FIG. 8
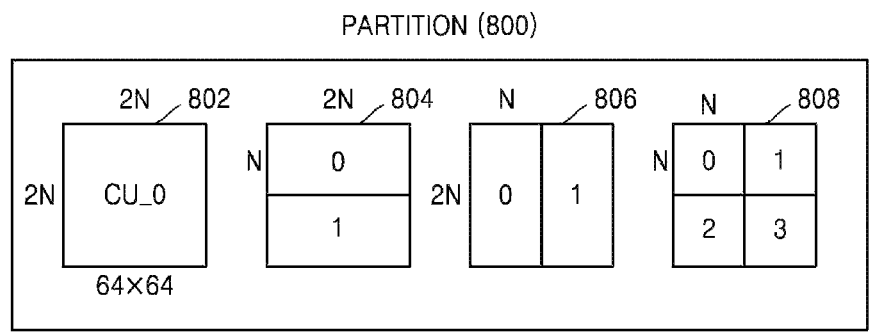
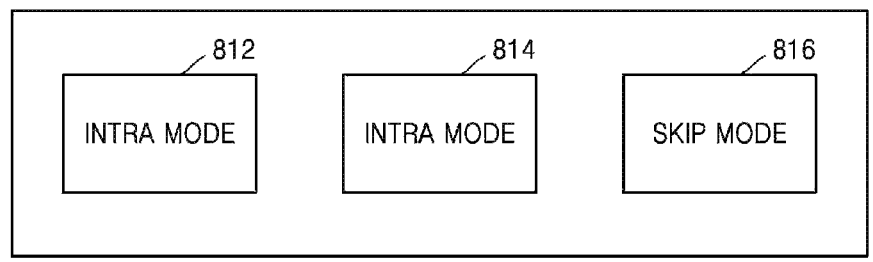
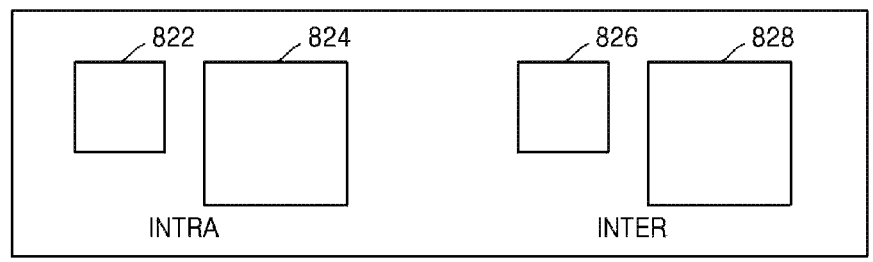

ENCODING UNIT (1010)

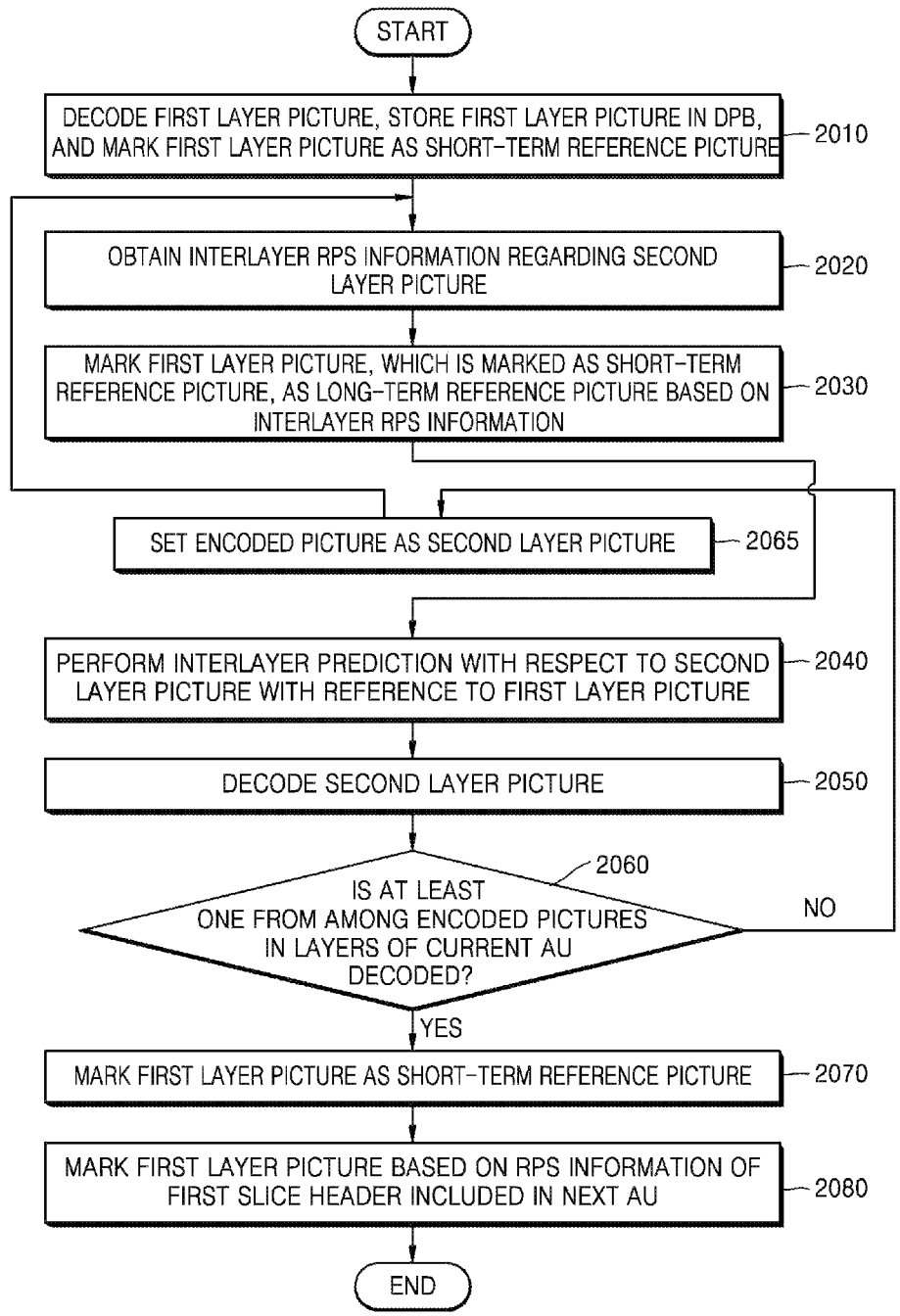

FIG. 28

Decoding process for inter-layer reference picture set
Output of this process is an updated list of inter-layer pictures RefPicSetInterLayer.
The list RefPicSetInterLayer is first emptied and then derived as follows.

```
for( i = 0; i < NumDirectRefLayers[ LayerIdInVps[ nuh_layer_id ] ]; i++ ) {
    RefPicSetInterLayer[ i ] = the picture with picture order count equal to PicOrderCnt and
        nuh_layer_id equal to RefLayerId[ LayerIdInVps[ nuh_layer_id ] ][ i ] ]
    RefPicSetInterLayer[ i ] is marked as "used for long-term reference"
```
⎫ 2810
⎬ 2820
⎭

Marking process for ending the decoding of a coded picture with nuh_layer_id greater than 0
Output of this process is:
- a potentially updated marking as "used for short-term reference" for some decoded pictures.
The following applies.

```
for( i = 0; i < NumDirectRefLayers[ LayerIdInVps[ nuh_layer_id ] ]; i++ )
    RefPicSetInterLayer[ i ] is marked as "used for short-term reference"
```
⎫ 2830
⎭

FIG. 29

F.8.1 General decoding process

The decoding process operates as follows for the current picture CurrPic:
1. The decoding of NAL units is specified in subclause 8.2.

2. The processes in subclause 8.3 specify the following decoding processes using syntax elements in the slice segment layer and above:
   - Variables and functions relating to picture order count are derived in subclause 8.3.1. This needs to be invoked only for the first slice segment of a picture.
   - The decoding process for RPS in subclause 8.3.2 is invoked, wherein reference pictures may be marked as "unused for reference" or ~~"used for long-term reference"~~ used for short-term reference". This needs to be invoked only for the first slice segment of a picture. } 2910
   - When the current picture is a BLA picture or is a CRA picture with NoRaslOutputFlag equal to 1, the decoding process for generating unavailable reference pictures specified in subclause 8.3.3 is invoked, which needs to be invoked only for the first slice segment of a picture.
   - PicOutputFlag is set as follows:
      - If the current picture is a RASL picture and NoRaslOutputFlag of the associated IRAP picture is equal to 1, PicOutputFlag is set equal to 0.
      - Otherwise, PicOutputFlag is set equal to pic_output_flag.
   - At the beginning of the decoding process for each P or B slice, the decoding process for reference picture lists construction specified in subclause 8.3.4 is invoked for derivation of reference picture list 0 (RefPicList0) and, when decoding a B slice, reference picture list 1 (RefPicList1).

3. The processes in subclauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each form a partitioning of the picture.

4. After all slices of the current picture have been decoded, the decoded picture is marked as ~~"used for short-term reference"~~ "used for long-term reference". } 2920

* ~~Decoding process for inter-layer reference picture set~~
~~Output of this process is an updated list of inter-layer pictures RefPicSetInterLayer.~~
~~The list RefPicSetInterLayer is first emptied and then derived as follows:~~
~~for( i = 0; i < NumDirectRefLayers[ LayerIdInVps[ nuh_layer_id ] ]; i++ ) {~~
  ~~RefPicSetInterLayer[ i ] = the picture with picture order count equal to PicOrderCnt and~~
    ~~nuh_layer_id equal to RefLayerId[ LayerIdInVps[ nuh_layer_id ] ][ i ] }~~
  ~~RefPicSetInterLayer[ i ] is marked as "used for long-term reference"~~

* ~~Marking process for ending the decoding of a coded picture with nuh_layer_id greater than 0~~
~~Output of this process is:~~
  ~~a potentially updated marking as "used for short-term reference" for some decoded pictures. The following applies.~~
~~The following applies:~~

~~for( i = 0; i < NumDirectRefLayers[ LayerIdInVps[ nuh_layer_id ] ]; i++ )~~
      ~~RefPicSetInterLayer[ i ] is marked as "used for short-term reference"~~

FIG. 30

Marking process for ending the decoding of all coded pictures with nuh_layer_id greater than 0 in the ) 3010
current access unit Output of this process is:

–     a potentially updated marking as "used for short-term reference" for some decoded pictures.

The following applies.

```
for( i = 0; i <= vps_max_layers_minus1; i++ )
    the picture, marked as "used for long-term reference", with picture order count equal to        } 3020
    PicOrderCntVal and with nuh_layer_id equal to LayerIdInVps[ nuh_layer_id ] is marked as "used for
    short-term reference"
```

FIG. 31

4. After all slices of the current picture have been decoded, if InterlayerPredictionFlag is equal to 1, the decoded picture is marked as "used for long-term reference". If InterlayerPredictionFlag is equal to 0, the decoded picture is marked as "used for short-term reference". } 3110

~~Decoding process for inter-layer reference picture set~~
~~Output of this process is an updated list of inter-layer pictures RefPicSetInterLayer.~~
~~The list RefPicSetInterLayer is first emptied and then derived as follows:~~
~~for( i = 0; i < NumDirectRefLayers[ LayerIdInVps[ nuh_layer_id ] ]; i++ ) {~~
  ~~RefPicSetInterLayer[ i ] = the picture with picture order count equal to PicOrderCnt and~~
    ~~nuh_layer_id equal to RefLayerId[ LayerIdInVps[ nuh_layer_id ] ][ i ]~~
  ~~RefPicSetInterLayer[ i ] is marked as "used for long-term reference"~~
~~}~~

Marking process for ending the decoding of all coded pictures with nuh_layer_id greater than 0 in the current access unit } 3120
Output of this process is:
- a potentially updated marking as "used for short-term reference" for some decoded pictures.
The following applies.

for( i = 1; i <= vps_max_layers_minus1; i++ )
    the picture with picture order count equal to PicOrderCntVal and
    with InterlayerPredictionFlag equal to1 is marked as "used for short-term reference" } 3130

FIG. 32

| vps_extension( ) { | Descriptor |
|---|---|
| ... | |
| for( i = 1; i<= vps_max_layers_minus1; i++ ) { | |
| // layer dependency | |
| for( j = 0; j <i; j++ ) | |
| direct_dependency_flag[ i ][ j ] | u(1) |
| } | |
| for( i = 0; i<= vps_max_layers_minus1; i++ ) { | |
| max_sublayer_for_ilp_plus1[i] | u(3) |
| } | |
| } | |

3210

The variable InterlayerPredictionFlag indicates whether the current layer is used as reference picture for inter-layer prediction of other layers.

The InterlayerPredictionFlag of the ith layer can be inferred from max_sublayer_for_ilp_plus1[ i ] as follows:

if (TemporalId > max_sublayer_for_ilp_plus1[ i ] − 1)
   InterlayerPredictionFlag = 0
else
   InterlayerPredictionFlag = 1

Input to this process is:
- a nuh_layer_id value latestDecLayerId

Output of this process is:
- potentially updated marking as "unused for reference" for some decoded pictures NOTE – This process marks pictures that are not needed for inter or inter-layer prediction as "unused for reference". When TemporalId is less than HighestTid, the current picture may be used for reference in inter prediction and this process is not invoked.

The variables numTargetDecLayers, and latestDecIdx are derived as follows:

- numTargetDecLayers is set equal to the number of entries in TargetDecLayerIdList.

- latestDecIdx is set equal to the value of i for which TargetDecLayerIdList[ i ] is equal to latestDecLayerId.

The following applies for marking of pictures as "unused for reference":

```
for( i = 0; i <= latestDecIdx; i++ ) {
  if( the picture with picture order count equal to PicOrderCntVal and
      with nuh_layer_id equal to TargetDecLayerIdList[ i ] is not marked as     ⎫
      "unused for reference" and is a sub-layer non-reference picture ) {       ⎬ 3310
    if(!InterlayerPredictionFlag)                                               ⎭
      mark the picture with picture order count equal to PicOrderCntVal and
3320      with nuh_layer_id equal to TargetDecLayerIdList[ i ] as "unused for reference"
  }
}
```

METHOD AND APPARATUS FOR DECODING MULTI-LAYER VIDEO, AND METHOD AND APPARATUS FOR ENCODING MULTI-LAYER VIDEO

CROSS-REFERENCE TO RELATED APPLICATIONS

This application is a U.S. national stage application under 35 U.S.C. § 371 of International Application No. PCT/KR2014/002995, filed on Apr. 7, 2014, in the Korean Intellectual Property Office, which claims priority from U.S. Provisional Application No. 61/808,884, filed on Apr. 5, 2013, in the U.S. Patent and Trademark Office, the disclosures of which are incorporated herein by reference in their entireties.

FIELD

Methods and apparatuses consistent with exemplary embodiments relate to encoding and decoding multi-layer video, and more particularly, to a method of managing a decoded picture buffer that stores decoded pictures.

DESCRIPTION OF RELATED ART

Generally, video data is encoded according to a designated data compression standard, e.g., a moving picture expert group (MPEG) compression standard, and is stored in a data storage medium or transmitted via a communication channel in the form of bit streams.

Scalable video encoding (SVC) is a video compression method for suitably adjusting a data amount and transmitting data in correspondence to various types of communication networks and terminals. Furthermore, multi-view encoding (MVC) is used for compressing multi-view video, such as three-dimensional (3D) pictures.

In SVC and MVC, video is encoded according to a limited encoding method based on macro blocks of designated sizes.

SUMMARY

Aspects of the exemplary embodiments relate to a method of efficiently managing a decoding picture buffer used for decoding pictures included in multi-layer video. Aspects of the exemplary embodiments provide a method of efficiently transmitting reference picture information regarding respective pictures included in the multi-layer video for efficiently managing a decoding picture buffer while the multi-layer video is being decoded.

According to an aspect of an exemplary embodiment, there is provided a method of decoding multi-layer video, the method including decoding a first layer picture, storing the decoded first layer picture in a decoded picture buffer (DPB), and marking the first layer picture as a short-term reference picture; obtaining interlayer reference picture set (RPS) information regarding a second layer picture having a same first picture order count (POC) as the first layer picture; marking the first layer picture, which is marked as the short-term reference picture, as a long-term reference picture based on the interlayer RPS information; performing interlayer prediction with respect to the second layer picture with reference to the first layer picture; decoding the second layer picture based on a result of performing the interlayer prediction; and, after the second layer picture is decoded, marking the first layer picture, which is marked as the long-term reference picture, as a short-term reference picture.

The interlayer RPS information includes information regarding a reference picture used for interlayer prediction of the second layer picture or pictures that are decoded after the second layer picture and have the first POC, and, in the marking of the first layer picture as the long-term reference picture, if layer information RefLayerId regarding a reference picture included in the interlayer RPS information includes layer information nuh_layer_id regarding the first layer picture, the first layer picture, which is marked as the short-term reference picture, as the long-term reference picture.

The method further includes obtaining RPS information regarding a picture which is decoded after the second layer picture and has a second POC different from that of the first layer picture; and updating reference picture status of the first layer picture marked as the short-term reference picture based on the obtained RPS information.

The marking of the first layer picture, which is marked as the long-term reference picture, as the short-term reference picture includes marking the first layer picture, which is marked as the long-term reference picture, as a short-term reference picture after at least one from among encoded pictures of layers of a current access unit is decoded.

According to another aspect of the inventive concept, there is provided a method of decoding multi-layer video, the method including decoding a first layer picture, storing the decoded first layer picture in a decoded picture buffer (DPB); obtaining information indicating whether the first layer picture is used as a reference picture for interlayer prediction; and marking the first layer picture based on the obtained information.

The marking of the first layer picture includes marking the first layer picture as a long-term reference picture if the first layer picture is used as a reference picture for interlayer prediction.

If the first layer picture is used as a reference picture for interlayer prediction, further includes performing interlayer prediction with respect to the second layer picture with reference to the first layer picture; and decoding the second layer picture based on a result of performing the interlayer prediction.

The method further includes marking the first layer picture, which is marked as the long-term reference picture, as a short-term reference picture after at least one from among encoded pictures of layers of a current access unit is decoded.

the marking of the first layer picture includes, if the first layer picture is not used as a reference picture for interlayer prediction of pictures of other layers having the first POC value, marking the first layer picture as a short-term reference picture.

the obtaining of the information indicating whether the first layer picture is used as a reference picture for interlayer prediction of pictures of other layers includes obtaining information indicating whether the first layer picture is used as a reference picture for interlayer prediction of pictures of other layers having the first POC value based on at least one from between picture quality and temporal hierarchical information regarding the first layer picture.

the marking of the first layer picture includes, if the first layer picture is not used as a reference picture for interlayer prediction of pictures of other layers having the first POC value, marking the first layer picture as a picture not to be used as a reference picture.

According to another aspect of the inventive concept, there is provided a method of decoding multi-layer video, the method including decoding a first layer picture, storing the decoded first layer picture in a decoded picture buffer (DPB), and marking the first layer picture as a long-term reference picture; after all pictures included in a current access unit are decoded, obtaining RPS information regarding a picture having a second POC different from that of the first layer picture; and updating reference picture status of the first layer picture marked as the long-term reference picture based on the obtained RPS information.

According to another aspect of the inventive concept, there is provided a multi-layer video decoding apparatus including a decoded picture buffer, which stores decoded pictures; a parsing unit, which obtains interlayer reference picture set (RPS) information regarding a second layer picture having a same first picture order count (POC) as a previously decoded first layer picture; a decoded picture buffer controller, which stores the first layer picture in the decoded picture buffer, marks the first layer picture as a short-term reference picture, marks the first layer picture, which is marked as the short-term reference picture, as a long-term reference picture based on the interlayer RPS information, and, after the second layer picture is decoded, marks the first layer picture, which is marked as the long-term reference picture, as a short-term reference picture; and a video decoder, which decodes pictures included in multi-layers and performs interlayer prediction with respect to the second layer picture with reference to the first layer picture.

According to another aspect of the inventive concept, there is provided a multi-layer video decoding apparatus including a decoded picture buffer, which stores decoded pictures; a parsing unit, which obtains information indicating whether a first layer picture is used as a reference picture for interlayer prediction; a decoded picture buffer controller, which stores the first layer picture in the decoded picture buffer and marks the first layer picture based on the obtained information; and a video decoder, which decodes pictures included in multi-layers.

the parsing unit obtains information indicating whether the first layer picture is used as a reference picture for interlayer prediction based on at least one from between picture quality and temporal hierarchical information regarding the first layer picture.

BRIEF DESCRIPTION OF THE DRAWINGS

FIG. 7 is a diagram for describing a relationship between an encoding unit and transform units, according to an exemplary embodiment;

FIG. 8 is a diagram for describing encoding information of encoding units corresponding to a coded depth, according to an exemplary embodiment;

FIG. 20 is a flowchart of a method of decoding multi-layer video based on interlayer RPS information, according to an exemplary embodiment;

FIG. 28 shows an example of codes for performing interlayer prediction, according to an exemplary embodiment;

FIG. 29 shows an example of codes for performing interlayer prediction, an exemplary embodiment;

FIG. 30 shows an example of codes for performing interlayer prediction based on interlayer RPS information, according to an exemplary embodiment;

FIG. 31 shows an example of codes for performing interlayer prediction based on an interlayer prediction flag, according to an exemplary embodiment;

FIG. 32 shows an example of codes for obtaining an interlayer prediction flag, according to an exemplary embodiment; and FIG. 33 shows an example of codes for marking pictures based on an interlayer prediction flag, according to an exemplary embodiment.

DETAILED DESCRIPTION OF EXEMPLARY EMBODIMENTS

Figure 1:
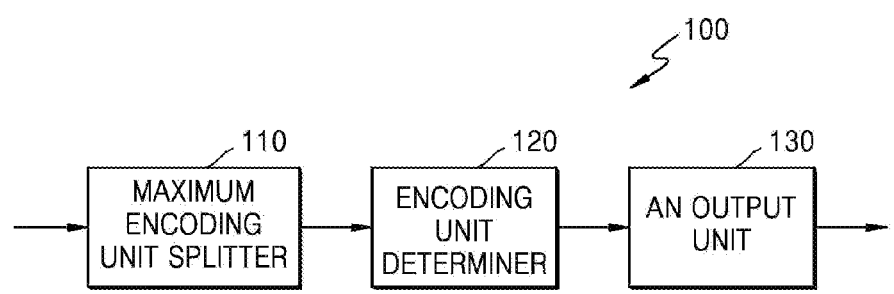
FIG. 1 is a block diagram of a video encoding apparatus according to an exemplary embodiment.

Hereinafter, the exemplary embodiments will be described in detail with reference to the attached drawings. In the description, certain detailed explanations of related art that may unnecessarily obscure the description are omitted. Furthermore, like reference numerals in the drawings denote like elements throughout.

Preferred embodiments are described hereafter in detail with reference to the accompanying drawings. Before describing the exemplary embodiments, the terms and terminologies used in the specification and claims should not be construed to have common or dictionary meanings, but construed to have meanings and concepts matching the spirit of the disclosure under the principle that the inventor(s) can appropriately define the concept of these terminologies to explain the inventive concepts in an optimum method. Accordingly, it should be understood that there may be various equivalents and modifications are applicable to the descriptions herein.

Throughout the specification, when a portion "includes" an element, another element may be further included, rather than excluding the existence of the other element, unless otherwise described. Furthermore, the term "unit" or "module" used throughout the specification refers to a unit of processing at least one function or operation and may be embodied as hardware, software, or a combination thereof.

The term 'picture' used throughout the specification may not be used to refer to 'pictures,' but also used to collectively refer to various types of video image data, such as 'frames,' 'fields,' and 'slices.'

Hereinafter, the exemplary embodiments will be described more fully with reference to the accompanying drawings. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the disclosure to one of ordinary skill in the art. In the drawings, widely understood features are omitted for clarity, and like reference numerals in the drawings denote like elements throughout.

Hereinafter, the exemplary embodiments will be described with reference to the accompanying drawings.

FIG. 1 is a block diagram of a video encoding apparatus 100 according to an exemplary embodiment.

The video encoding apparatus 100 includes a maximum encoding unit splitter 110, an encoding unit determiner 120, and an output unit 130.

The maximum encoding unit splitter 110 may split a current picture according to a maximum encoding unit for the current picture of an image. If a size of the current picture is larger than a size of the maximum encoding unit, image data of the current picture may be split into at least one maximum encoding unit. The maximum encoding unit according to an exemplary embodiment may be a data unit having a size of 32×32, 64×64, 128×128, 256×256, etc., and a shape of the data unit is a square having a width and length in squares of 2. The partitioned image data may be output to the encoding unit determiner 120 according to the at least one maximum encoding unit.

An encoding unit according to an exemplary embodiment may be characterized by a maximum size and a depth. The depth denotes a number of times the encoding unit is spatially split from the maximum encoding unit, and as the depth increases, deeper encoding units according to depths may be split from the maximum encoding unit to a minimum encoding unit. A depth of the maximum encoding unit is an uppermost depth and a depth of the minimum encoding unit is a lowermost depth. Because a size of an encoding unit corresponding to each depth decreases as the depth of the maximum encoding unit deepens, an encoding unit corresponding to an upper depth may include a plurality of encoding units corresponding to lower depths.

As described above, the image data of the current picture is split into the maximum encoding units according to a maximum size of the encoding unit, and each of the maximum encoding units may include deeper encoding units that are split according to depths. Because the maximum encoding unit according to an exemplary embodiment is split according to depths, the image data in the spatial domain included in the maximum encoding unit may be hierarchically classified according to depths.

A maximum depth and a maximum size of an encoding unit, which limit the total number of times a height and a width of the maximum encoding unit are hierarchically split, may be predetermined.

The encoding unit determiner 120 encodes at least one split region obtained by splitting a region of the maximum encoding unit according to depths, and determines a depth to output finally encoded image data according to the at least one split region. In other words, the encoding unit determiner 120 determines a coded depth by encoding, according to the maximum encoding unit of the current picture, the image data in the deeper encoding units according to depths and selecting a depth having the smallest encoding error. Thus, the encoded image data of the encoding unit corresponding to the determined coded depth is output. Also, the encoding units corresponding to the coded depth may be regarded as encoded encoding units. The determined coded depth and the encoded image data according to the determined coded depth are output to the output unit 130.

The image data in the maximum encoding unit is encoded based on the deeper encoding units corresponding to at least one depth equal to or less than the maximum depth, and results of encoding the image data are compared based on each of the deeper encoding units. A depth having the smallest encoding error may be selected after comparing encoding errors of the deeper encoding units. At least one coded depth may be selected for each maximum encoding unit.

The size of the maximum coding unit is split as an encoding unit is hierarchically split according to depths and as the number of encoding units increases. Also, even if encoding units correspond to a same depth in one maximum encoding unit, it is determined whether to split each of the encoding units corresponding to the same depth to a lower depth by measuring an encoding error of the image data of the each encoding unit, separately. Accordingly, even when image data is included in one maximum encoding unit, the image data is split into regions according to the depths and the encoding errors may differ according to regions in the one maximum encoding unit, and thus the coded depths may differ according to regions in the image data. Thus, one or more coded depths may be determined in one maximum encoding unit, and the image data of the maximum encoding unit may be divided according to encoding units of at least one coded depth.

Accordingly, the encoding unit determiner 120 according to an exemplary embodiment may determine encoding units having a tree structure included in the maximum encoding unit. The 'coding units having a tree structure' according to an exemplary embodiment include encoding units corresponding to a depth determined to be the coded depth from among all deeper encoding units included in the maximum encoding unit. An encoding unit of a coded depth may be hierarchically determined according to depths in the same region of the maximum encoding unit, and may be independently determined in different regions. Similarly, a coded depth in a current region may be independently determined from a coded depth in another region.

A maximum depth according to an exemplary embodiment is an index related to the number of times splitting is performed from a maximum encoding unit to a minimum encoding unit. A first maximum depth according to an exemplary embodiment may denote the total number of times splitting is performed from the maximum encoding unit to the minimum encoding unit. A second maximum depth according to an exemplary embodiment may denote the total number of depth levels from the maximum encoding unit to the minimum encoding unit. For example, when a depth of the maximum encoding unit is 0, a depth of an encoding unit in which the maximum encoding unit is split once may be set to 1, and a depth of an encoding unit in which the maximum encoding unit is split twice may be set to 2. In this case, if the minimum encoding unit is an encoding unit in which the maximum encoding unit is split four times, 5 depth levels of depths 0, 1, 2, 3, and 4 exist, and thus the first maximum depth may be set to 4 and the second maximum depth may be set to 5.

Prediction encoding and transformation may be performed according to the maximum encoding unit. The prediction encoding and the transformation are also performed based on the deeper encoding units according to a depth equal to less than the maximum depth, according to the maximum encoding unit. Transformation may be performed according to a method of orthogonal transformation or integer transformation.

Because the number of deeper encoding units increases whenever the maximum encoding unit is split according to depths, encoding including the prediction encoding and the transformation is performed on all of the deeper encoding units generated as the depth deepens. For convenience of description, the prediction encoding and the transformation will now be described based on an encoding unit of a current depth in a maximum encoding unit.

The video encoding apparatus 100 may select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select an encoding unit for encoding the image data and a data unit different from the encoding unit to perform the prediction encoding on the image data in the encoding unit.

In order to perform prediction encoding in the maximum encoding unit, the prediction encoding may be performed based on an encoding unit corresponding to a coded depth, i.e., based on an encoding unit that is no longer split into encoding units corresponding to a lower depth. Hereinafter, the encoding unit that is no longer split and becomes a basis unit for prediction encoding will now be referred to as an 'prediction unit.' A partition obtained by splitting the prediction unit may include an prediction unit or a data unit obtained by splitting at least one of a height and a width of the prediction unit.

For example, when an encoding unit of 2N×2N (where N is a positive integer) is no longer split and becomes an prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in an encoding unit, thereby selecting an prediction mode having a smallest encoding error.

The video encoding apparatus 100 may also perform the transformation on the image data in an encoding unit based on the encoding unit for encoding the image data and a data unit that is different from the encoding unit.

In order to perform the transformation in the encoding unit, the transformation may be performed based on a data unit having a size smaller than or equal to a size of the encoding unit. For example, the data unit for the transformation may include a data unit for an intra mode and a data unit for an inter mode.

A data unit used as a base of the transformation will now be referred to as a 'transform unit.' Similar to the encoding unit, the transform unit in the encoding unit may be recursively split into smaller sized regions, so that the transform unit may be independently determined in units of regions. Thus, residual data in the encoding unit may be divided according to the transform unit having the tree structure according to transformation depths.

A transformation depth indicating the number of times splitting is performed to reach the transform unit by splitting the height and width of the encoding unit may also be set in the transform unit. For example, in a current encoding unit of 2N×2N, a transformation depth may be 0 when the size of a transform unit is 2N×2N, may be 1 when the size of a transform unit is N×N, and may be 2 when the size of a transform unit is N/2×N/2. That is, the transform unit having the tree structure may also be set according to transformation depths.

Encoding information according to encoding units corresponding to a coded depth requires not only information about the coded depth, but also about information related to prediction encoding and transformation. Accordingly, the encoding unit determiner 120 determines a coded depth having a smallest encoding error, a partition type in an prediction unit, an prediction mode according to prediction units, and a size of a transform unit for transformation.

Coding units having a tree structure in a maximum encoding unit and a method of determining a partition, according to exemplary embodiments, will be described in detail later with reference to FIGS. 3 through 12.

The encoding unit determiner 120 may measure an encoding error of deeper encoding units according to depths by using Rate-Distortion (RD) Optimization based on Lagrangian multipliers.

The output unit 130 outputs the image data of the maximum encoding unit, which is encoded based on the at least one coded depth determined by the encoding unit determiner 120, and information about the encoding mode according to the coded depth in bitstreams.

The encoded image data may be obtained by encoding residual data of an image.

The information about the encoding mode according to a coded depth may include information about the coded depth, the partition type in the prediction unit, the prediction mode, and the size of the transform unit.

The information about the coded depth may be defined by using split information according to depths, which indicates whether encoding is performed on encoding units of a lower depth instead of a current depth. If the current depth of the current encoding unit is the coded depth, image data in the current encoding unit is encoded and output, and thus the split information may be defined not to split the current encoding unit to a lower depth. Alternatively, if the current depth of the current encoding unit is not the coded depth, the encoding is performed on the encoding unit of the lower depth, and thus the split information may be defined to split the current encoding unit to obtain the encoding units of the lower depth.

If the current depth is not the coded depth, encoding is performed on the encoding unit that is split into the encoding unit of the lower depth. Because at least one encoding unit of the lower depth exists in one encoding unit of the current depth, the encoding is repeatedly performed on each encoding unit of the lower depth, and thus the encoding may be performed for the encoding units having the same depth.

Because the encoding units having a tree structure are determined for one maximum encoding unit, and information about at least one encoding mode is determined for an encoding unit of a coded depth, information about at least one encoding mode may be determined for one maximum encoding unit. Also, a coded depth of the image data of the maximum encoding unit may differ according to locations because the image data is hierarchically split according to depths, and thus information about the coded depth and the encoding mode may be set for the image data.

Accordingly, the output unit 130 may assign encoding information about a corresponding coded depth and an encoding mode to at least one of the encoding unit, the prediction unit, and a minimum unit included in the maximum encoding unit.

The minimum unit according to an exemplary embodiment is a rectangular data unit obtained by splitting the minimum encoding unit constituting the lowermost depth by 4. Alternatively, the minimum unit may be a maximum rectangular data unit that may be included in all of the encoding units, prediction units, partition units, and transform units included in the maximum encoding unit.

For example, the encoding information output through the output unit 130 may be classified into encoding information according to encoding units, and encoding information according to prediction units. The encoding information according to the encoding units may include the information about the prediction mode and about the size of the partitions. The encoding information according to the prediction units may include information about an predicted direction of an inter mode, about a reference image index of the inter mode, about a motion vector, about a chroma component of an intra mode, and about an interpolation method of the intra mode. Also, information about a maximum size of the encoding unit defined according to pictures, slices, or groups of pictures (GOPs), and information about a maximum depth may be inserted into a header of a bitstream.

In the video encoding apparatus 100, the deeper encoding unit may be an encoding unit obtained by dividing a height or width of an encoding unit of an upper depth, which is one layer above, by two. In other words, when the size of the encoding unit of the current depth is 2N×2N, the size of the encoding unit of the lower depth is N×N. Also, the encoding unit of the current depth having the size of 2N×2N may include a maximum number of four encoding units of the lower depth.

Accordingly, the video encoding apparatus 100 may form the encoding units having the tree structure by determining encoding units having an optimum shape and an optimum size for each maximum encoding unit, based on the size of the maximum encoding unit and the maximum depth determined considering characteristics of the current picture. Also, because encoding may be performed on each maximum encoding unit by using any one of various prediction modes and transformations, an optimum encoding mode may be determined considering characteristics of the encoding unit of various image sizes.

Thus, if an image having high resolution or a data amount thereof is large is encoded in a conventional macroblock, a number of macroblocks per picture excessively increases. Accordingly, a number of pieces of compressed information generated for each macroblock increases, and thus compression efficiency decreases. However, by using the video encoding apparatus 100, image compression efficiency may be increased because an encoding unit is adjusted by considering characteristics of an image while increasing a maximum size of an encoding unit in consideration of a size of the image.

Figure 2:
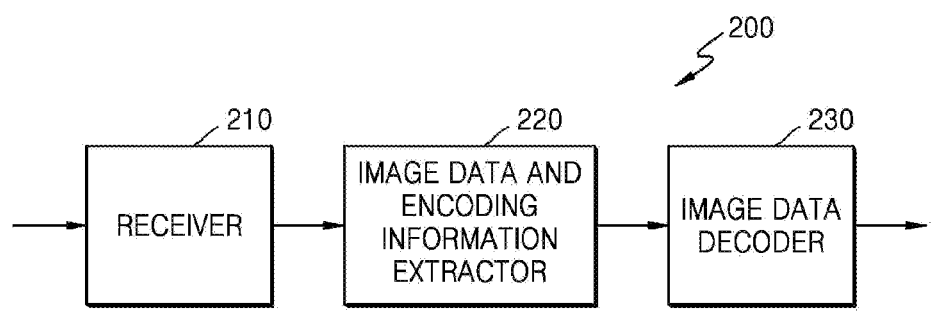
FIG. 2 is a block diagram of a video decoding apparatus, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as an encoding unit, a depth, a prediction unit, a transform unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each encoding unit from the parsed bitstream, the encoding units having a tree structure according to each maximum encoding unit, and outputs the extracted image data to the image data decoder 230. The image data and encoding information extractor 220 may extract from a header about the current picture information about a maximum size of an encoding unit of a current picture.

Also, the image data and encoding information extractor 220 extracts from the parsed bitstream information about a coded depth and an encoding mode for the encoding units having a tree structure according to each maximum encoding unit. The extracted information about the coded depth and the encoding mode is output to the image data decoder 230. In other words, the image data in a bit stream is split into the maximum encoding unit so that the image data decoder 230 decodes the image data for each maximum encoding unit.

The information about the coded depth and the encoding mode according to the maximum encoding unit may be set for information about at least one encoding unit corresponding to the coded depth, and information about an encoding mode may include information about a partition type of a corresponding encoding unit corresponding to the coded depth, about an prediction mode, and a size of a transform unit. Also, splitting information according to depths may be extracted as the information about the coded depth.

The information about the coded depth and the encoding mode according to each maximum encoding unit extracted by the image data and encoding information extractor 220 is information about a coded depth and an encoding mode determined to generate a minimum encoding error when an encoder, such as the video encoding apparatus 100, repeatedly performs encoding for each deeper encoding unit according to depths according to each maximum encoding unit. Accordingly, the video decoding apparatus 200 may restore an image by decoding the image data according to a coded depth and an encoding mode in which the minimum encoding error is generated.

Because encoding information about the coded depth and the encoding mode may be assigned to a predetermined data unit from among a corresponding encoding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be the data units included in the same maximum encoding unit.

The image data decoder 230 restores the current picture by decoding the image data in each maximum encoding unit based on the information about the coded depth and the encoding mode according to the maximum encoding units. In other words, the image data decoder 230 may decode the encoded image data based on the extracted information about the partition type, the prediction mode, and the transform unit for each encoding unit from among the encoding units that have the tree structure included in each maximum encoding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and an prediction mode of each encoding unit, based on the information about the partition type and the prediction mode of the prediction unit of the encoding unit according to coded depths.

Also, the image data decoder 230 may perform inverse transformation according to each transform unit in the encoding unit, based on the information about the size of the transform unit of the encoding unit according to coded depths, to perform the inverse transformation according to maximum encoding units.

The image data decoder 230 may determine at least one coded depth of a current maximum encoding unit by using split information according to depths. If the split information indicates that image data is no longer split in the current depth, the current depth is a coded depth. Accordingly, the image data decoder 230 may decode encoded data of at least one encoding unit corresponding to the each coded depth in the current maximum encoding unit by using the information about the partition type of the prediction unit, the prediction mode, and the size of the transform unit for each encoding unit corresponding to the coded depth, and output the image data of the current maximum encoding unit.

In other words, data units containing the encoding information including the same split information may be gathered by observing the encoding information set assigned for the predetermined data unit from among the encoding unit, the prediction unit, and the minimum unit, and the gathered data units may be considered to be one data unit to be decoded by the image data decoder 230 in the same encoding mode.

The video decoding apparatus 200 may obtain information about at least one encoding unit that generates the minimum encoding error when encoding is recursively performed for each maximum encoding unit, and may use the information to decode the current picture. In other words, the encoding units that have the tree structure determined to be the optimum encoding units in each maximum encoding unit may be decoded.

Accordingly, even if image data has high resolution and an amount thereof is large, the image data may be efficiently decoded and restored by using a size of an encoding unit and an encoding mode, which are adaptively determined according to characteristics of the image data, by using information about an optimum encoding mode received from an encoder.

A method of determining encoding units having a tree structure, an prediction unit, and a transform unit, according to an exemplary embodiment, will now be described with reference to FIGS. 3 through 13.

Figure 3:
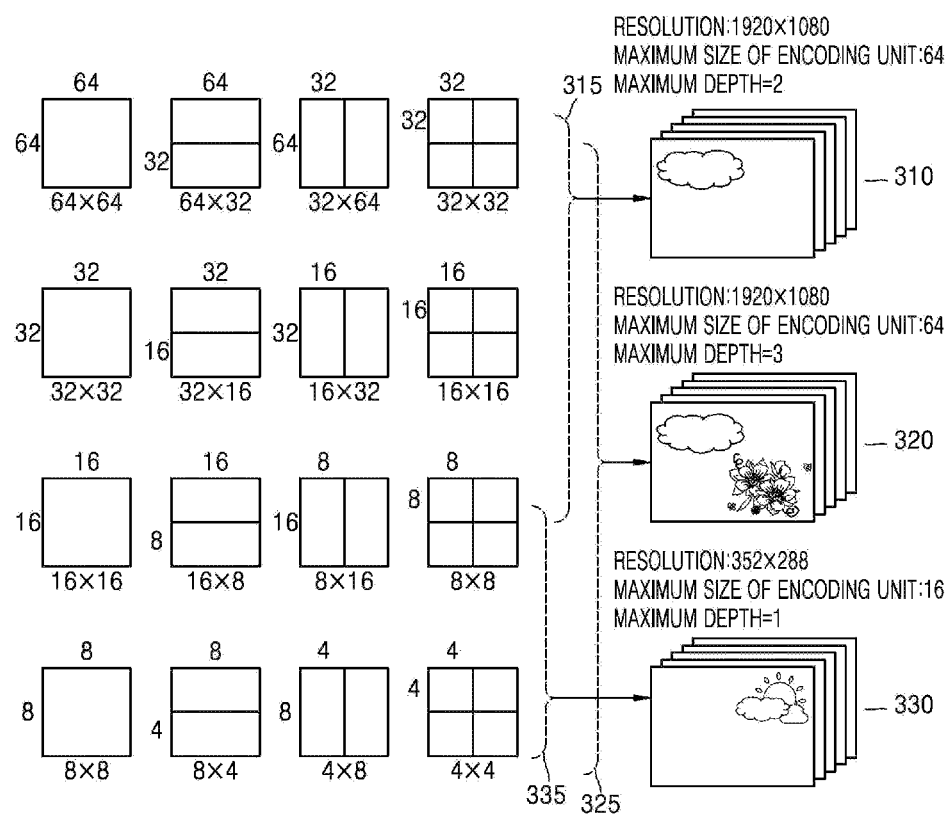
FIG. 3 is a diagram for describing a concept of encoding units according to an exemplary embodiment.

FIG. 3 is a diagram for describing a concept of encoding units according to an exemplary embodiment.

A size of an encoding unit may be expressed in width by height, and may be 64×64, 32×32, 16×16, and 8×8. An encoding unit of 64×64 may be split into partitions of 64×64, 64×32, 32×64, or 32×32, and an encoding unit of 32×32 may be split into partitions of 32×32, 32×16, 16×32, or 16×16, an encoding unit of 16×16 may be split into partitions of 16×16, 16×8, 8×16, or 8×8, and an encoding unit of 8×8 may be split into partitions of 8×8, 8×4, 4×8, or 4×4.

In video data 310, a resolution is 1920×1080, a maximum size of an encoding unit is 64, and a maximum depth is 2. In video data 320, a resolution is 1920×1080, a maximum size of an encoding unit is 64, and a maximum depth is 3. In video data 330, a resolution is 352×288, a maximum size of an encoding unit is 16, and a maximum depth is 1. The maximum depth shown in FIG. 3 denotes a total number of splits from a maximum encoding unit to a minimum decoding unit.

If a resolution is high or a data amount is large, a maximum size of an encoding unit may be large to increase the encoding efficiency and accurately reflect the characteristics of an image. Accordingly, the maximum size of the encoding unit of the video data 310 and 320 having the higher resolution than the video data 330 may be 64.

Because the maximum depth of the video data 320 is 3, encoding units 325 of the video data 320 may include a maximum encoding unit having a long axis size of 64, and encoding units having long axis sizes of 32, 16, and 8 because the depths are deepened to 3 layers by splitting the maximum encoding unit three times. As a depth deepens, detailed information may be precisely expressed.

Figure 4:
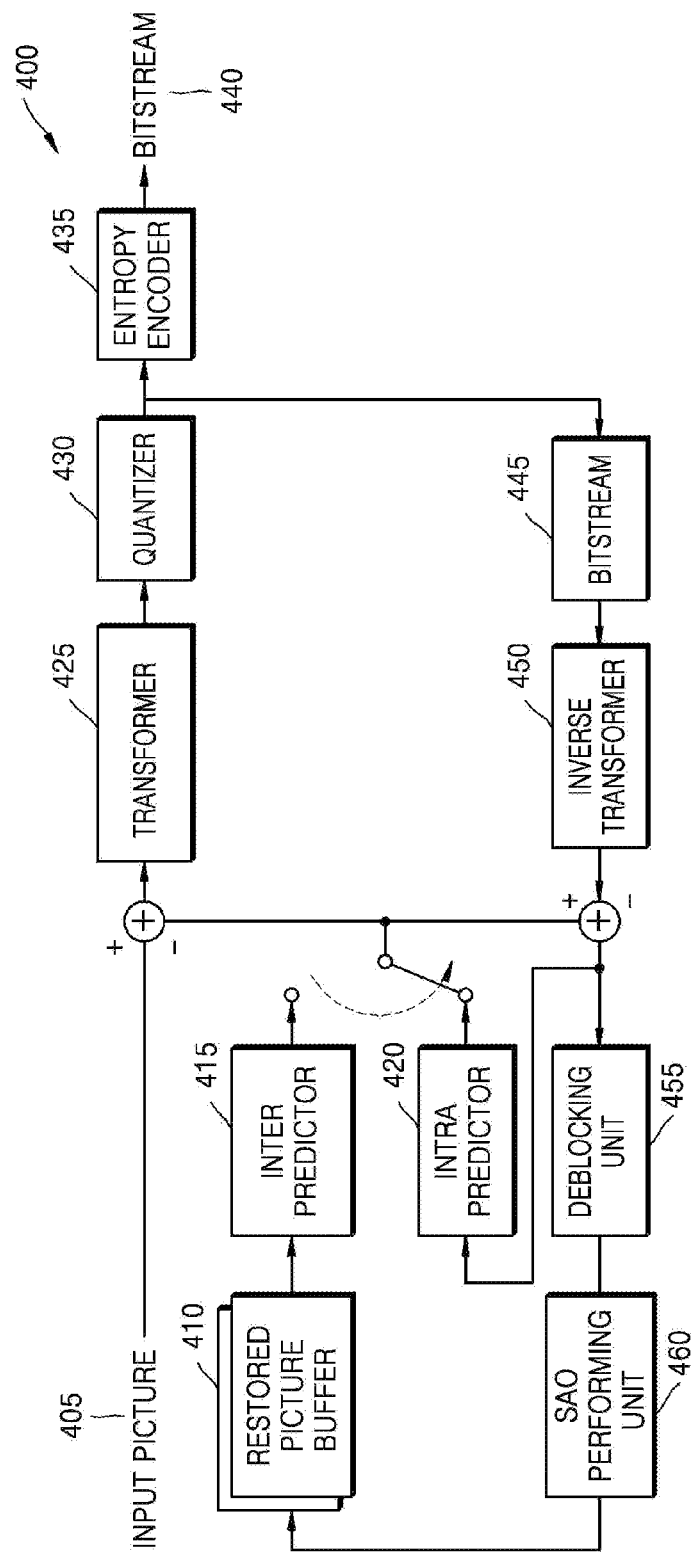
FIG. 4 is a block diagram of an image encoder based on encoding units, according to an exemplary embodiment.

FIG. 4 is a block diagram of an image encoder 400 based on encoding units, according to an exemplary embodiment.

The image encoder 400 performs operations of the encoding unit determiner 120 of the video encoding apparatus 100 to encode image data. In other words, an intra predictor 420 performs, based on an prediction unit, intra prediction on encoding units in an intra mode, from a current picture 405, and an inter predictor 415 performs, based on prediction units, inter prediction on encoding units in an inter mode from the current picture 405 by using the current picture 405 and reference frame obtained from a restored picture buffer 410. The current picture 405 may be divided into maximum encoding units and may be sequentially encoded. In this case, encoding may be performed with respect to encoding units that are to be formed by dividing a maximum encoding unit in a tree structure.

Residual data is generated by subtracting prediction data related to encoding units of the respective modes output by the intra predictor 420 or the inter predictor 415 from data related to encoding units from the current picture 405 that is being encoded, and the residual data is output as a quantized transformation coefficient through a transformer 425 and a quantizer 430. The quantized transformation coefficient is restored as residual data in the spatial domain through an inverse quantizer 445 and an inverse transformer 450. The residual data in the spatial domain is restored as data in the spatial domain related to encoding units of the current picture 405 by being added to the prediction data related to encoding units of the respective modes output by the intra predictor 420 or the inter predictor 415. The restored data in the spatial domain is output as a restored picture after being post-processed through a deblocking unit 455 and a SAO performing unit 460. Restored pictures stored in the restored picture buffer 410 may be used as reference pictures for inter predicting other pictures. The transformation coefficient quantized by the transformer 425 and the quantizer 430 may be output as a bitstream 440 through an entropy encoder 435.

In order to use the image encoder 400 in the video encoding apparatus 100, all elements of the image encoder 400, i.e., the intra predictor 415, the intra predictor 420, the transformer 425, the quantizer 430, the entropy encoder 435, the inverse quantizer 445, the inverse transformer 450, the deblocking unit 455, and the SAO performing unit 460 may perform operations based on each encoding unit from among encoding units having a tree structure of each maximum encoding unit.

Specifically, the intra predictor 420 and the inter predictor 415 determines a partition mode and an prediction mode of each encoding unit from among the encoding units having a tree structure by considering the maximum size and the maximum depth of a current maximum encoding unit, and the transformer 425 determines whether to split the transform unit in each encoding unit based on a quad tree from among the encoding units having a tree structure.

Figure 5:
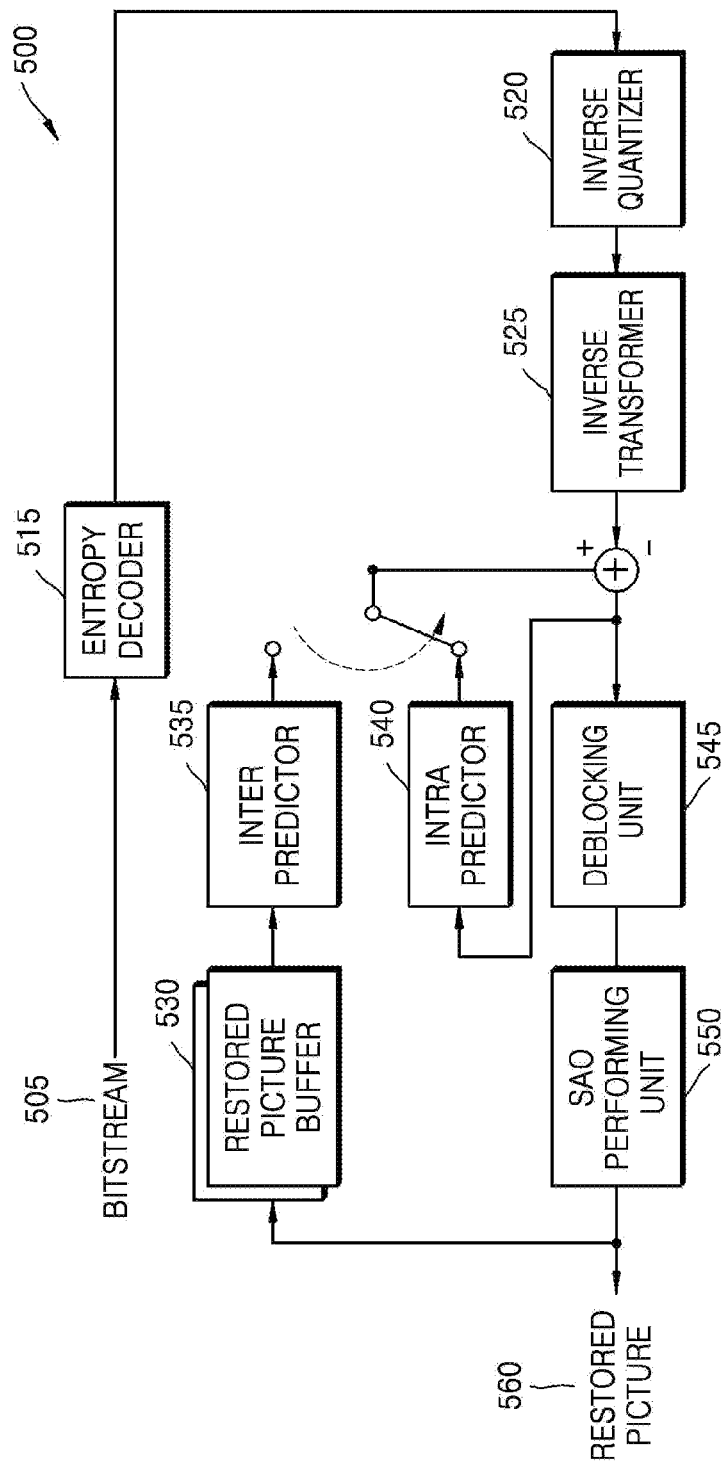
FIG. 5 is a block diagram of an image decoder based on encoding units, according to an exemplary embodiment.

FIG. 5 is a block diagram of an image decoder 500 based on encoding units, according to an exemplary embodiment.

An entropy decoder 515 parses encoded image data to be decoded and information about encoding required for decoding from a bitstream 505. The encoded image data is quantized transformation coefficient, where an inverse quantizer 520 and an inverse transformer 525 restore residue data from the quantized transformation coefficient.

An intra predictor 540 performs intra prediction on encoding units in an intra mode. An inter predictor 535 performs inter prediction on encoding units in an inter mode from among the current picture by using the current picture and reference frame obtained from a restored picture buffer 530, based on prediction units.

Data in a spatial domain is restored as prediction data related to encoding units of the respective modes output by the intra predictor 540 or the inter predictor 535 is added to residual data, and the restored data in the spatial domain may be output as a restored picture 560 after being post-processed through a deblocking unit 545 and a SAO performing unit 550. Furthermore, restored pictures stored in the restored picture buffer 530 may be output as reference pictures.

In order to decode the image data in the image data decoder 230 of the video decoding apparatus 200, the image decoder 500 may perform operations that are performed after operations of the entropy decoder 515 may be performed.

In order for the image decoder 500 to be applied in the video decoding apparatus 200, all elements of the image decoder 500, i.e., the entropy decoder 515, the inverse quantizer 520, the inverse transformer 530, the intra predictor 540, the inter predictor 535, the deblocking unit 545, and the SAO performing unit 550 may perform operations based on encoding units having a tree structure for each maximum encoding unit.

Specifically, the intra predictor 540 and the inter predictor 535 determine a partition mode and an prediction mode for each of the encoding units having a tree structure, and the inverse transformer 525 determines whether to split the transform unit in each encoding unit based on a quad tree from among the encoding units having a tree structure.

Figure 6:
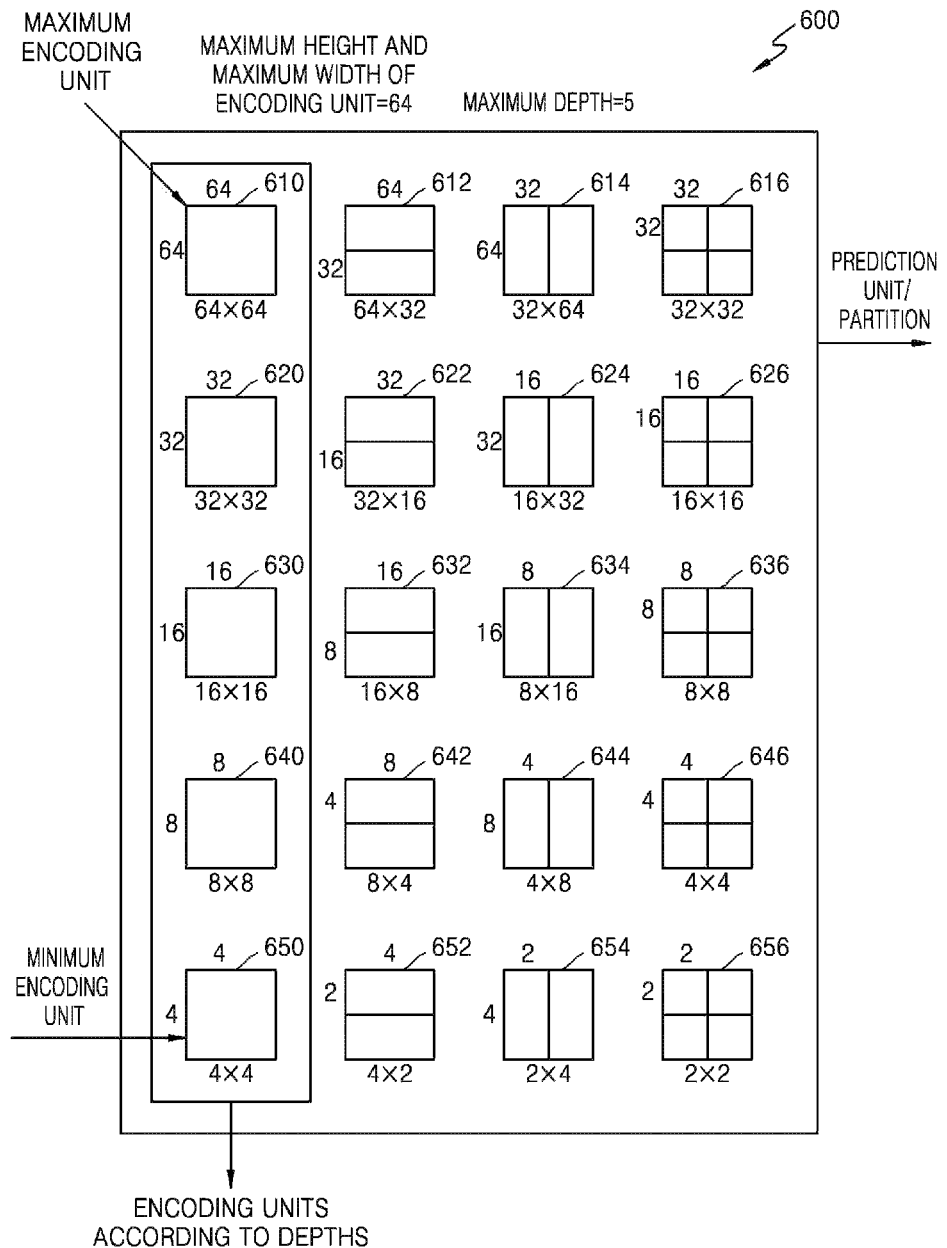
FIG. 6 is a diagram illustrating deeper encoding units according to depths, and partitions, according to an exemplary embodiment.

FIG. 6 is a diagram illustrating deeper encoding units according to depths, and partitions, according to an exemplary embodiment.

The video encoding apparatus 100 and the video decoding apparatus 200 use hierarchical encoding units to consider characteristics of an image. A maximum height, a maximum width, and a maximum depth of encoding units may be adaptively determined according to the characteristics of the image, or may be differently set by a user. Sizes of deeper encoding units according to depths may be determined according to the predetermined maximum size of the encoding unit.

In a hierarchical structure 600 of encoding units, according to an exemplary embodiment, the maximum height and the maximum width of the encoding units are each 64, and the maximum depth is 4. Because a depth deepens along a vertical axis of the hierarchical structure 600, a height and a width of the deeper encoding unit are each split. Also, an prediction unit and partitions, which are bases for prediction encoding of each deeper encoding unit, are shown along a horizontal axis of the hierarchical structure 600.

In other words, an encoding unit 610 is a maximum encoding unit in the hierarchical structure 600, wherein a depth is 0 and a size, i.e., a height by width, is 64×64. The depth deepens along the vertical axis, and an encoding unit 620 having a size of 32×32 and a depth of 1, an encoding unit 630 having a size of 16×16 and a depth of 2, an encoding unit 640 having a size of 8×8 and a depth of 3, and an encoding unit 650 having a size of 4×4 and a depth of 4 exist. The encoding unit 650 having the size of 4×4 and the depth of 4 is a minimum encoding unit.

The prediction unit and the partitions of an encoding unit are arranged along the horizontal axis according to each depth. In other words, if the encoding unit 610 having the size of 64×64 and the depth of 0 is an prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the encoding unit 620 having the size of 32×32 and the depth of 1 may be split into partitions included in the encoding unit 620, i.e., a partition 620 having a size of 32×32, partitions 622 having a size of 32×16, partitions 624 having a size of 16×32, and partitions 626 having a size of 16×16.

Similarly, a prediction unit of the encoding unit 630 having the size of 16×16 and the depth of 2 may be split into partitions included in the encoding unit 630, i.e., a partition having a size of 16×16 included in the encoding unit 630, partitions 632 having a size of 16×8, partitions 634 having a size of 8×16, and partitions 636 having a size of 8×8.

Similarly, a prediction unit of the encoding unit 640 having the size of 8×8 and the depth of 3 may be split into partitions included in the encoding unit 640, i.e., a partition having a size of 8×8 included in the encoding unit 640, partitions 642 having a size of 8×4, partitions 644 having a size of 4×8, and partitions 646 having a size of 4×4.

The encoding unit 650 having the size of 4×4 and the depth of 4 is the minimum encoding unit and an encoding unit of the lowermost depth. A prediction unit of the encoding unit 650 is only assigned to a partition having a size of 4×4.

In order to determine the at least one coded depth of the encoding units constituting the maximum encoding unit 610, the encoding unit determiner 120 of the video encoding apparatus 100 performs encoding for encoding units corresponding to each depth included in the maximum encoding unit 610.

A number of deeper encoding units according to depths including data in the same range and the same size increases as the depth deepens. For example, four encoding units corresponding to a depth of 2 are required to cover data that is included in one encoding unit corresponding to a depth of 1. Accordingly, in order to compare encoding results of the same data according to depths, the encoding unit corresponding to the depth of 1 and four encoding units corresponding to the depth of 2 are each encoded.

In order to perform encoding for a current depth from among the depths, a smallest encoding error may be selected for the current depth by performing encoding for each prediction unit in the encoding units corresponding to the current depth, along the horizontal axis of the hierarchical structure 600. Alternatively, the minimum encoding error may be searched for by comparing the smallest encoding errors according to depths and performing encoding for each depth as the depth deepens along the vertical axis of the hierarchical structure 600. A depth and a partition having the minimum encoding error in the encoding unit 610 may be selected as the coded depth and a partition type of the encoding unit 610.

FIG. 7 is a diagram for describing a relationship between an encoding unit 710 and transform units 720, according to an exemplary embodiment.

The video encoding apparatus 100 or 200 encodes or decodes an image according to encoding units having sizes less than or equal to a maximum encoding unit for each maximum encoding unit. Sizes of transform units for transformation during encoding may be selected based on data units that are not larger than a corresponding encoding unit.

For example, in the video encoding apparatus 100 or 200, if a size of the encoding unit 710 is 64×64, transformation may be performed by using the transform units 720 having a size of 32×32.

Also, data of the encoding unit 710 having the size of 64×64 may be encoded by performing the transformation on each of the transform units having the size of 32×32, 16×16, 8×8, and 4×4, which are smaller than 64×64, and then a transform unit having the smallest encoding error may be selected.

FIG. 8 is a diagram for describing encoding information of encoding units corresponding to a coded depth, according to an exemplary embodiment.

The output unit 130 of the video encoding apparatus 100 may encode and transmit information 800 about a partition type, information 810 about an prediction mode, and information 820 about a size of a transform unit for each encoding unit corresponding to a coded depth, as information about an encoding mode.

The information 800 indicates information about a shape of a partition obtained by splitting an prediction unit of a current encoding unit. The partition is a data unit for prediction encoding the current encoding unit. For example, a current encoding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transform unit when transformation is performed on a current encoding unit. For example, the transform unit may be a first intra transform unit 822, a second intra transform unit 824, a first inter transform unit 826, or a second intra transform unit 828.

Figure 9:
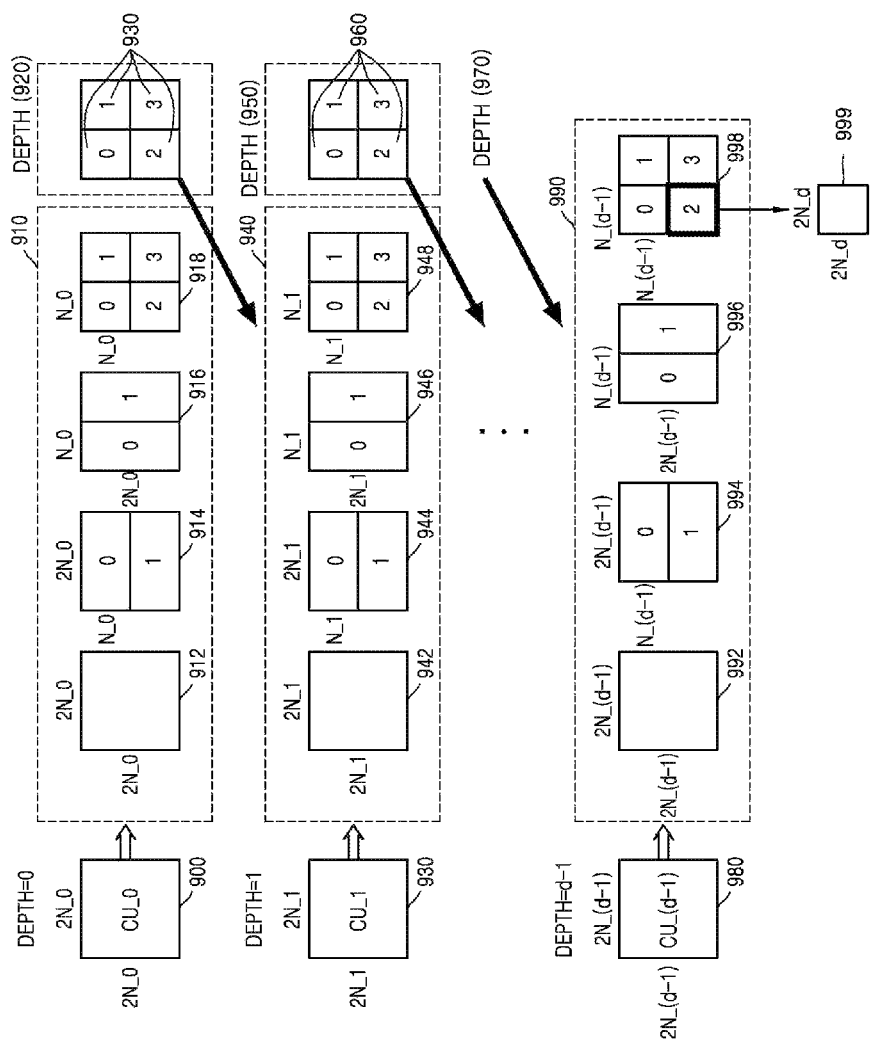
FIG. 9 is a diagram of deeper encoding units according to depths, according to an exemplary embodiment.

The image data and encoding information extractor 220 of the video decoding apparatus 200 may extract and use the information 800, 810, and 820 for decoding, according to each deeper encoding unit FIG. 9 is a diagram of deeper encoding units according to depths, according to an exemplary embodiment.

Split information may be used to indicate a change of a depth. The spilt information indicates whether an encoding unit of a current depth is split into encoding units of a lower depth.

An prediction unit 910 for prediction encoding an encoding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on encoding units 930 having a depth of 2 and a size of N_0×N_0 to search for a minimum encoding error.

An prediction unit 940 for prediction encoding the encoding unit 930 having a depth of 1 and a size of 2N_1×2N_1 may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on encoding units 960, which have a depth of 2 and a size of N_2×N_2 to search for a minimum encoding error.

When a maximum depth is d, a split operation according to each depth may be performed up to when a depth becomes d−1, and split information may be encoded up to when a depth is one of 0 to d−2. In other words, when encoding is performed up to when the depth is d−1 after an encoding unit corresponding to a depth of d−2 is split in operation 970, an prediction unit 990 for prediction encoding an encoding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, because a maximum depth is d, an encoding unit CU_(d−1) having a depth of d−1 is no longer split to a lower depth, and a coded depth for the encoding units constituting a current maximum encoding unit 900 is determined to be d−1 and a partition type of the current maximum encoding unit 900 may be determined to be N_(d−1)×N_(d−1). Also, because the maximum depth is d and a minimum encoding unit 980 having a lowermost depth of d−1 is no longer split to a lower depth, split information for the minimum encoding unit 980 is not set.

A data unit 999 may be a 'minimum unit' for the current maximum encoding unit. A minimum unit according to an exemplary embodiment may be a rectangular data unit obtained by splitting a minimum encoding unit 980 by 4. By iteratively performing the encoding, the video encoding apparatus 100 may select a depth having the smallest encoding error by comparing encoding errors according to depths of the encoding unit 900 to determine a coded depth, and set a corresponding partition type and an prediction mode as an encoding mode of the coded depth.

As such, the minimum encoding errors according to depths are compared in all of the depths of 1 through d, and a depth having the smallest encoding error may be determined as a coded depth. The coded depth, the partition type of the prediction unit, and the prediction mode may be encoded and transmitted as information about an encoding mode. Also, because an encoding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the encoding unit 900 to decode the partition 912. The video decoding apparatus 200 may determine a depth, in which split information is 0, as a coded depth by using split information according to depths, and use information about an encoding mode of the corresponding depth for decoding.

Figure 10:
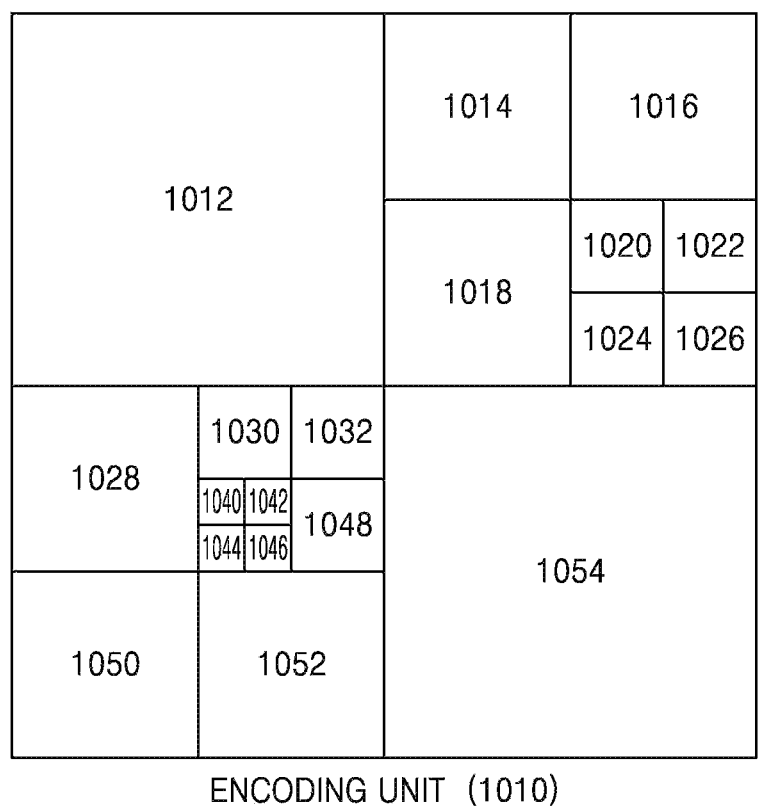
FIGS. 10 through 12 are diagrams for describing a relationship between encoding units, prediction units, and transform units, according to an exemplary embodiment.
Figure 11:
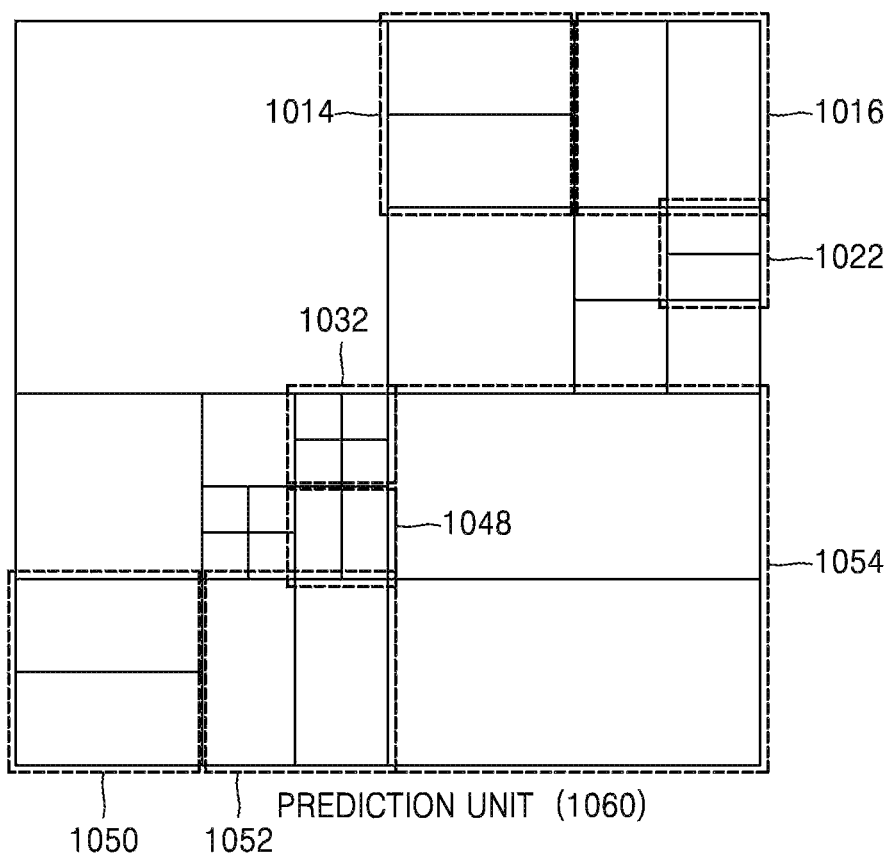
Figure 12:
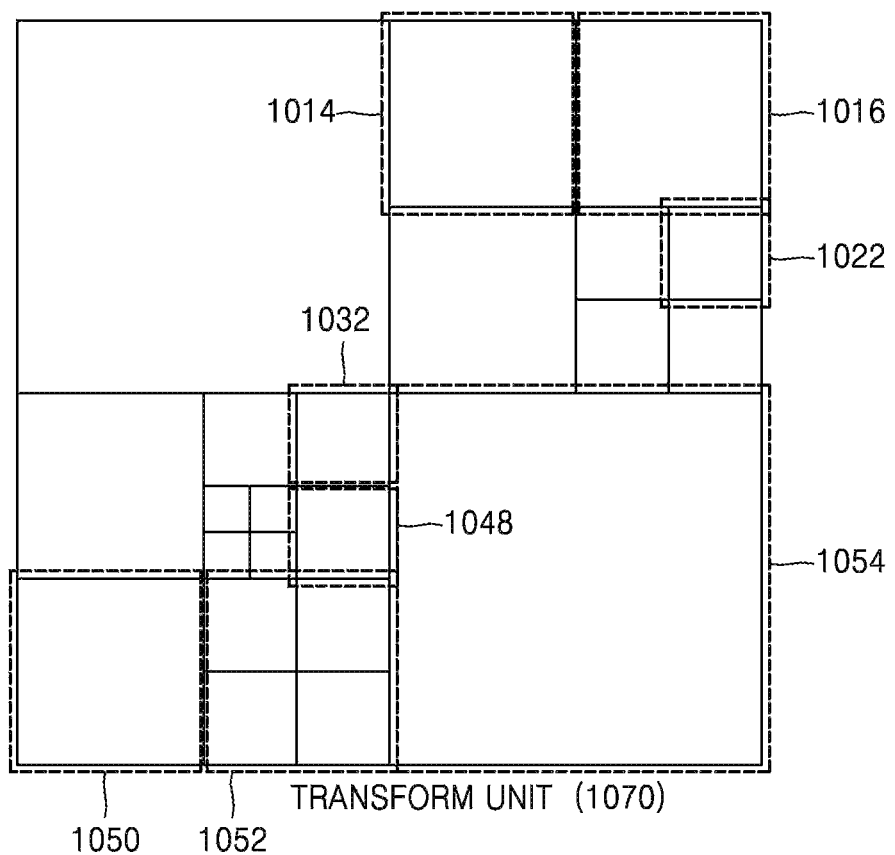

FIGS. 10 through 12 are diagrams for describing a relationship between encoding units, prediction units, and transform units, according to an exemplary embodiment.

The encoding units 1010 are encoding units having a tree structure, corresponding to coded depths determined by the video encoding apparatus 100, in a maximum encoding unit. The prediction units 1060 are partitions of prediction units of each of the encoding units 1010, and the transform units 1070 are transform units of each of the encoding units 1010.

When a depth of a maximum encoding unit is 0 in the encoding units 1010, depths of encoding units 1012 and 1054 are 1, depths of encoding units 1014, 1016, 1018, 1028, 1050, and 1052 are 2, depths of encoding units 1020, 1022, 1024, 1026, 1030, 1032, and 1048 are 3, and depths of encoding units 1040, 1042, 1044, and 1046 are 4.

In the prediction units 1060, some encoding units 1014, 1016, 1022, 1032, 1048, 1050, 1052, and 1054 are obtained by splitting the encoding units. In other words, partition types in the encoding units 1014, 1022, 1050, and 1054 have a size of 2N×N, partition types in the encoding units 1016, 1048, and 1052 have a size of N×2N, and a partition type of the encoding unit 1032 has a size of N×N. Prediction units and partitions of the encoding units 1010 are smaller than or equal to each encoding unit.

Transformation or inverse transformation is performed on image data of the encoding unit 1052 in the transform units 1070 in a data unit that is smaller than the encoding unit 1052. Also, the encoding units 1014, 1016, 1022, 1032, 1048, 1050, and 1052 in the transform units 1070 are different from those in the prediction units 1060 in terms of sizes and shapes. In other words, the video encoding and decoding apparatuses 100 and 200 may perform intra prediction, motion prediction, motion compensation, transformation, and inverse transformation individually on a data unit in the same encoding unit.

Accordingly, encoding is recursively performed on each of encoding units having a hierarchical structure in each region of a maximum encoding unit to determine an optimum encoding unit, and thus encoding units having a recursive tree structure may be obtained. Encoding information may include split information about an encoding unit, information about a partition type, information about an prediction mode, and information about a size of a transform unit. Table 1 shows the encoding information that may be set by the video encoding and decoding apparatuses 100 and 200.

TABLE 1

| | Split Information 0 (Encoding on encoding Unit having Size of 2N × 2N and Current Depth of d) | | | | Split Information 1 |
|---|---|---|---|---|---|
| Prediction Mode | Partition Type | | Size of Transform unit | | Repeatedly Encode |
| Intra | Symmetrifcal Partition Type | Asymmetrical Partition Type | Transform unit Split Information 0 | Transform unit Split Information 1 | encoding Units having Lower Depth of d + 1 |
| Inter | | | | | |
| Skip (Only 2N × 2N) | | | | | |
| | 2N × 2N | 2N × nU | 2N × 2N | N × N (Symmetrical Partition Type) | |
| | 2N × N | 2N × nD | | | |
| | N × 2N | nL × 2N | | N×/2 × N/2 (Asymmetrical Partition Type) | |
| | N × N | nR × 2N | | | |

The output unit 130 of the video encoding apparatus 100 may output the encoding information about the encoding units having a tree structure, and the image data and encoding information extractor 220 of the video decoding apparatus 200 may extract the encoding information about the encoding units having a tree structure from a received bitstream.

Split information indicates whether a current encoding unit is split into encoding units of a lower depth. If split information of a current depth d is 0, a depth, in which a current encoding unit is no longer split into a lower depth, is a coded depth. Thus, information about a partition type, prediction mode, and a size of a transform unit may be defined for the coded depth. If the current encoding unit is further split according to the split information, encoding is independently performed on four split encoding units of a lower depth.

An prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of an prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transform unit may be set to be two types in the intra mode and two types in the inter mode. In other words, if split information of the transform unit is 0, the size of the transform unit may be 2N×2N, which is the size of the current encoding unit. If split information of the transform unit is 1, the transform units may be obtained by splitting the current encoding unit. Also, if a partition type of the current encoding unit having the size of 2N×2N is a symmetrical partition type, a size of a transform unit may be N×N, and if the partition type of the current encoding unit is an asymmetrical partition type, the size of the transform unit may be N/2×N/2.

The encoding information about encoding units having a tree structure may include at least one of an encoding unit corresponding to a coded depth, an prediction unit, and a minimum unit. The encoding unit corresponding to the coded depth may include at least one of an prediction unit and a minimum unit containing the same encoding information.

Accordingly, it is determined whether adjacent data units are included in the same encoding unit corresponding to the coded depth by comparing encoding information of the adjacent data units. Also, a corresponding encoding unit corresponding to a coded depth is determined by using encoding information of a data unit, and thus a distribution of coded depths in a maximum encoding unit may be determined.

Accordingly, if a current encoding unit is predicted based on encoding information of adjacent data units, encoding information of data units in deeper encoding units adjacent to the current encoding unit may be directly referred to and used.

Alternatively, if a current encoding unit is predicted based on encoding information of adjacent data units, data units adjacent to the current encoding unit are searched using encoded information of the data units, and the searched adjacent encoding units may be referred to for predicting the current encoding unit.

Figure 13:
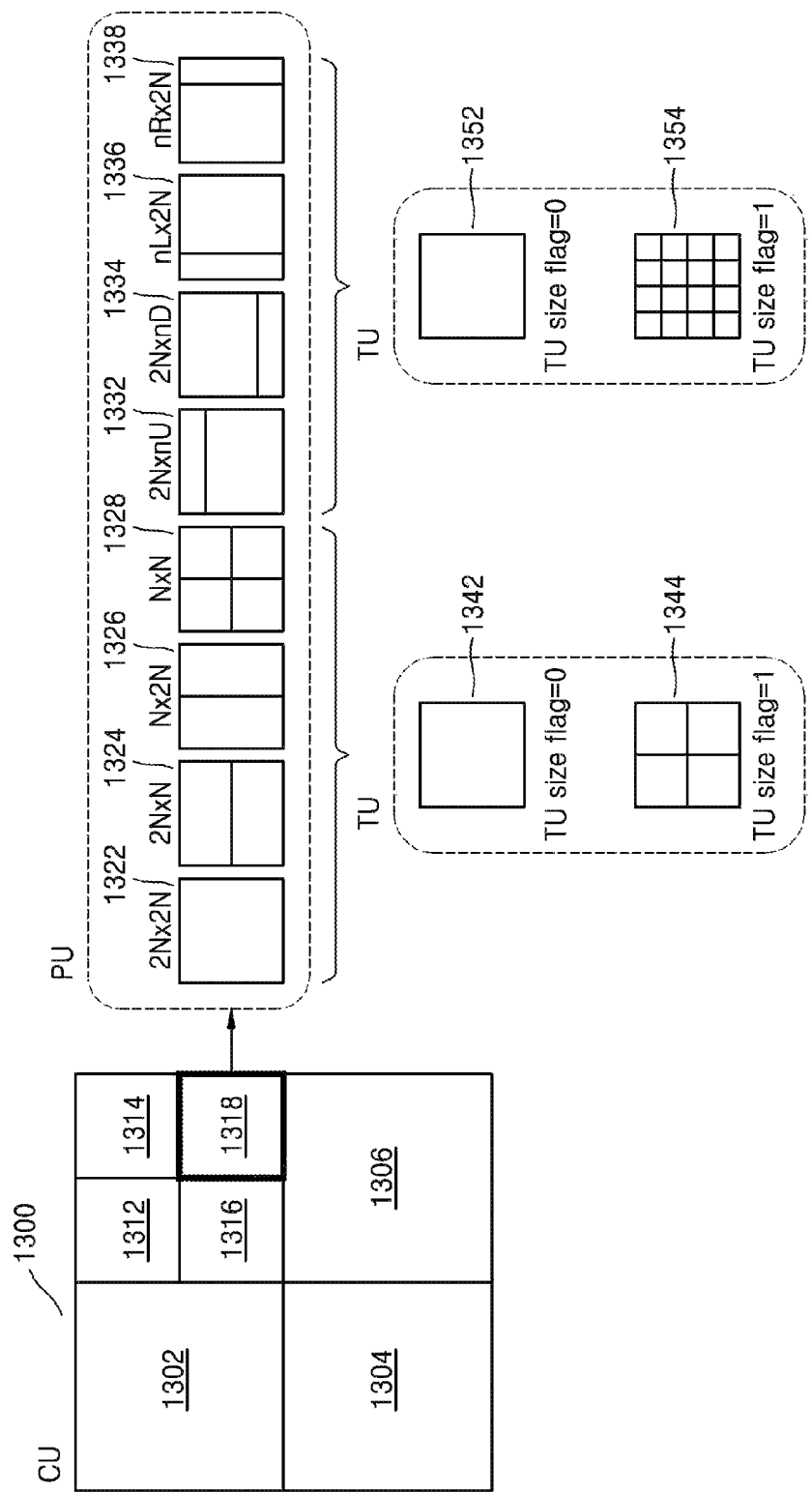
FIG. 13 is a diagram for describing a relationship between an encoding unit, an prediction unit or a partition, and a transform unit, according to the encoding mode information of Table 1.

FIG. 13 is a diagram for describing a relationship between an encoding unit, an prediction unit or a partition, and a transform unit, according to the encoding mode information of Table 1.

A maximum encoding unit 1300 includes encoding units 1302, 1304, 1306, 1312, 1314, 1316, and 1318 of coded depths. Here, because the encoding unit 1318 is an encoding unit of a coded depth, split information may be set to 0. Information about a partition type of the encoding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transform unit 1342 having a size of 2N×2N is set if split information (TU size flag) of a transform unit is 0, and a transform unit 1344 having a size of N×N is set if a TU size flag is 1.

When the partition type is set to be asymmetrical, i.e., the partition type 1332, 1334, 1336, or 1338, a transform unit 1352 having a size of 2N×2N is set if a TU size flag is 0, and a transform unit 1354 having a size of N/2×N/2 is set if a TU size flag is 1.

The maximum encoding unit including encoding units having a tree structure as described above with reference to FIGS. 1 through 13 may be referred to as various names, such as an encoding block tree, a block tree, a root block tree, an encoding tree, an encoding root, or a tree trunk.

Hereinafter, referring to FIGS. 14 through 22, a method and apparatus for encoding multi-layer video and a method and apparatus for decoding multi-layer video will be described. Hereinafter, an 'image' may refer to a still image of video or a moving picture, that is, the video. Furthermore, an encoding sequence is a sequence for processing an image at an encoding side, whereas a decoding sequence is a sequence for processing an image at an decoding side, where an encoding sequence and a decoding sequence are identical to each other.

Figure 14:
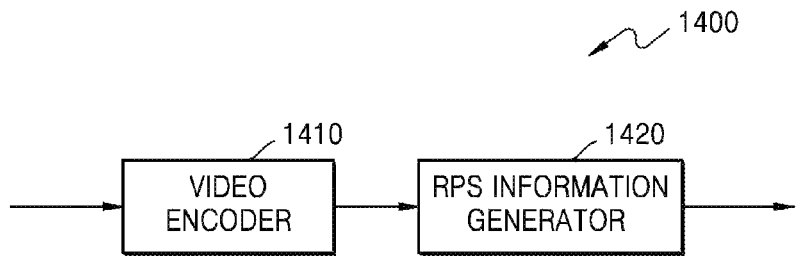
FIG. 14 is a block diagram of a multi-layer video encoding apparatus according to an exemplary embodiment.

FIG. 14 is a block diagram of a multi-layer video encoding apparatus 1400 according to an exemplary embodiment.

Referring to FIG. 14, the multi-layer video encoding apparatus 1400 includes a video encoder 1410 and a reference picture set (RPS) information generator 1420.

The video encoder 1410 receives and encodes multi-layer video. The video encoder 1410 corresponds to a video coding layer which encodes input video.

As described above with reference to FIGS. 1 through 13, the video encoder 1410 according to an exemplary embodiment splits each of pictures included in multi-layer video into maximum encoding units having a maximum size, splits the split maximum encoding units into encoding units, and encodes each of the pictures based on the encoding units. The encoding units have a tree structure formed by hierarchically splitting the maximum encoding unit according to depths. The video encoder 1410 performs prediction with respect to encoding units by using prediction units, and transforms residual data, which include differences between predicted values and original signals, by using transform units.

Multi-layer video may be multi-viewpoint video or scalable video. If multi-layer video is multi-viewpoint video, the video encoder 1410 encodes each of picture sequences of n (n is a natural number) viewpoints as a single layer. If multi-layer video is scalable video, the video encoder 1410 encodes picture sequence of a base layer and respective picture sequences of an enhancement layer.

Multi-layer video includes a larger amount of data as compared to single-layer video. Therefore, the video encoder 1410 may perform prediction encoding by using by using correlations between pictures of the respective layer included in multi-layer video. In other words, the video encoder 1410 may prediction encode a picture of each layer based on a picture of another layer. The prediction based on picture of a current layer and picture of another layer will be referred to as an inter-layer prediction.

For example, the video encoder 1410 may perform inter-view prediction for predicting pictures of additional viewpoints based on pictures of basic viewpoints. Furthermore, the video encoder 1410 may perform inter-view prediction for predicting pictures of other additional viewpoints based on pictures of predetermined additional viewpoints. Through an inter-view prediction, a disparity between a current picture and a reference picture and a residual, which is a difference between the current picture and the reference picture, may be generated. As described above, the inter-layer prediction may be performed based on encoding units having a tree structure, prediction units, or transform units.

The video encoder 1410 may determine reference relationships between pictures included in multi-layers by performing an inter prediction and an intra prediction in pictures of a same layer or performing an inter-layer prediction using a picture of another layer. Furthermore, the video encoder 1410 may perform an encoding by transforming and quantizing differences between original signals and predicted values generated during an inter prediction, an intra prediction and an inter-layer prediction. Through such an encoding operation, the video encoder 1410 outputs residual information regarding encoding units, prediction mode information, and additional information regarding prediction encoding of the encoding units.

Figure 22:
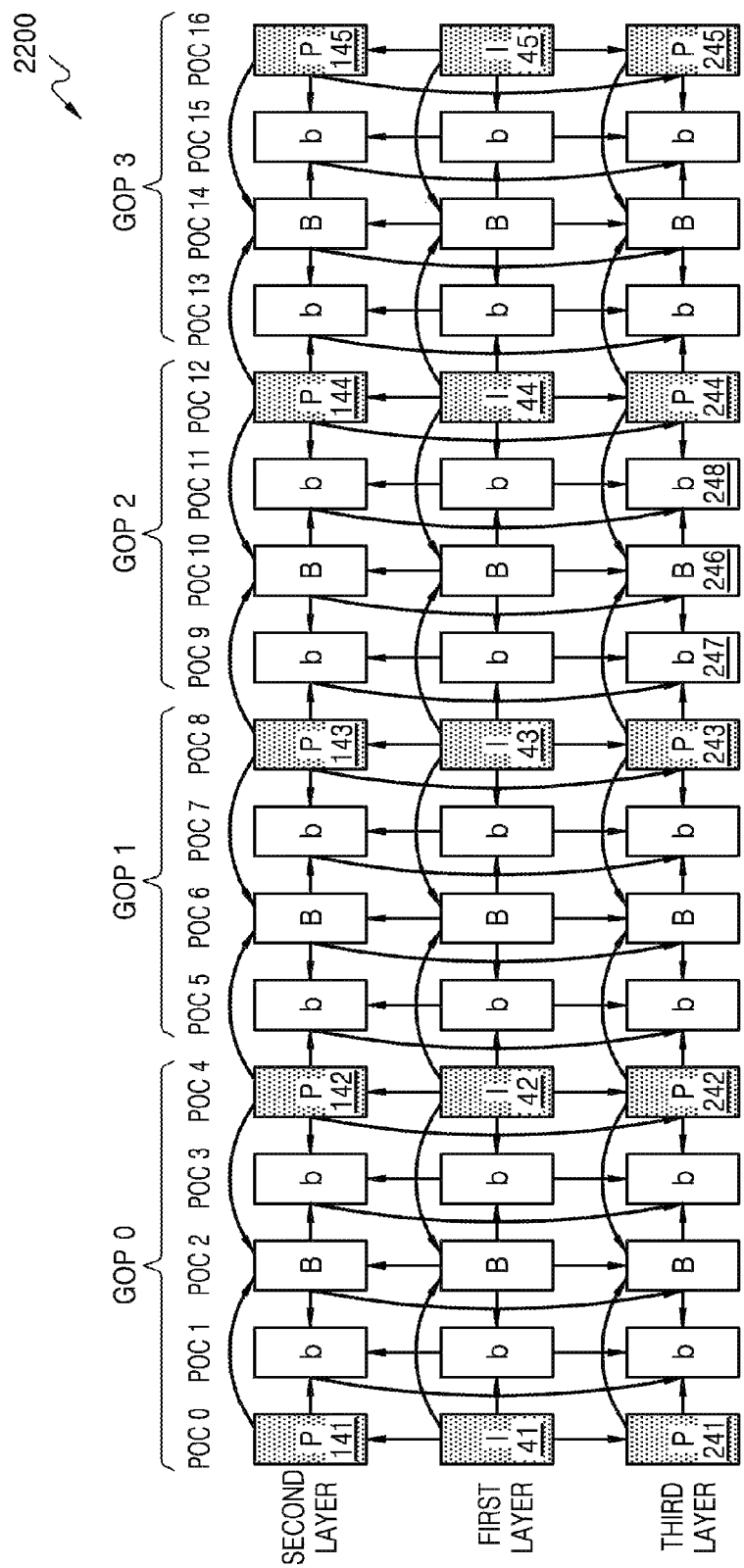
FIG. 22 is a diagram illustrating an example of inter-layer prediction structures according to an exemplary embodiment.

FIG. 22 is a diagram illustrating an example of inter-layer prediction structures according to an exemplary embodiment.

As described above, the multi-layer video encoding apparatus 1400 according to an exemplary embodiment may perform an inter-layer prediction for prediction encoding pictures of each layer based on pictures of another layer. For example, the inter-layer prediction structure 2200 shown in FIG. 22 indicates an prediction structure for prediction-encoding stereoscopic picture sequence including a first layer picture corresponding to the center viewpoint, a second layer picture corresponding to the left viewpoint, and a third layer picture corresponding to the right viewpoint. In FIG. 22, the arrows indicate reference directions of the respective pictures. For example, an I picture 41 of a first layer is used as a reference picture for a P picture 141 of a second layer and a P picture 241 of a third layer. Furthermore, pictures having a same picture order count (POC) sequence are arranged in the vertical direction. A POC sequence of pictures indicate a sequence of outputting or playing back pictures constituting video data. Four successive pictures constitute one group of pictures (GOP) per viewpoint. Each GOP includes pictures between successive key pictures and one key picture. Number and sequence of pictures included in a GOP may vary.

A key picture is a random access point. When an arbitrary playback point is selected from among pictures arranged in a picture playback sequence, that is, a POC sequence during video playback, a key picture corresponding to the closest POC sequence to the playback point is played back. First layer pictures include default viewpoint key pictures 41, 42, 43, 44, and 45, second layer pictures include left viewpoint key pictures 141, 142, 143, 144, and 145, and third layer pictures include right viewpoint key pictures 241, 242, 243, 244, and 245. As shown in FIG. 22, an inter layer prediction may be performed for pictures included in multi-layers with reference to a picture on a same layer and also a picture on another layer.

The video encoder 1410 encodes a random access point (RAP) picture, which is set for random access, from among pictures included in multi-layers without performing inter layer prediction. Examples of RAP pictures include an instantaneous decoding refresh (IDR) picture, a clean random access (CRA) picture, a broken link access (BLA) picture, a temporal sublayer access (TSA) picture, and a stepwise temporal sublayer access (STSA) picture. Such a RAP picture is encoded via an intra prediction without referring to another picture. The video encoder 1410 may perform an inter layer prediction with respect to non-RAP pictures from among pictures included in multi-layers. A RAP picture may be used as a reference picture for another layer.

The video encoder 1410 may determine referring relationships between pictures included in multi-layers via an intra prediction, an inter prediction, and an interlayer prediction. In other words, the video encoder 1410 may determine based on which of pictures each of pictures included in multi-layers is prediction-encoded. An optimal reference picture referred by each of pictures may be determined based on rate-distortion cost or a referring relationship between input picture sequences may be determined based on designated encoding rules set in advance by the video encoder 1410.

For a decoder to restore a picture, it is necessary to transmit information regarding a reference picture to be referenced by a picture encoded via an inter prediction or an interlayer prediction. Therefore, a RPS information generator 1420 generates RPS information regarding reference pictures referred by respective pictures included in multi-layers. RPS information may be information indicating whether pictures previously restored and stored in a decoded picture buffer (referred to hereinafter as a 'DPB') are used as reference pictures of a current picture and pictures after the current picture. RPS information according to an exemplary embodiment includes first short-term RPS information RefPicSetStCurrBefore, second short-term RPS information RefPicSetStCurrAfter, third short-term RPS information RefPicSetStFoll, first long-term RPS information RefPicSetLtCurr, and second long-term RPS information RefPicSetLtFoll. Particularly, RPS information according to an exemplary embodiment further includes interlayer RPS information indicating a referring relationship for an inter-layer prediction between pictures, which are included in a same access unit (AU) and transmitted, in consideration of a referring relationship for interlayer-prediction in multi-layer video. A same AU may include pictures having a same output time, that is, a same POC. Interlayer RPS information may include information regarding whether a picture, which has a same POC as that of a current picture, is included in different layers, is previously restored, and is stored in a DPB, is used as a reference picture for interlayer prediction of the current picture. RPS information according to an exemplary embodiment may be included in the slice header of each picture and transmitted. Detailed descriptions of RPS information will be given below.

Figure 15:
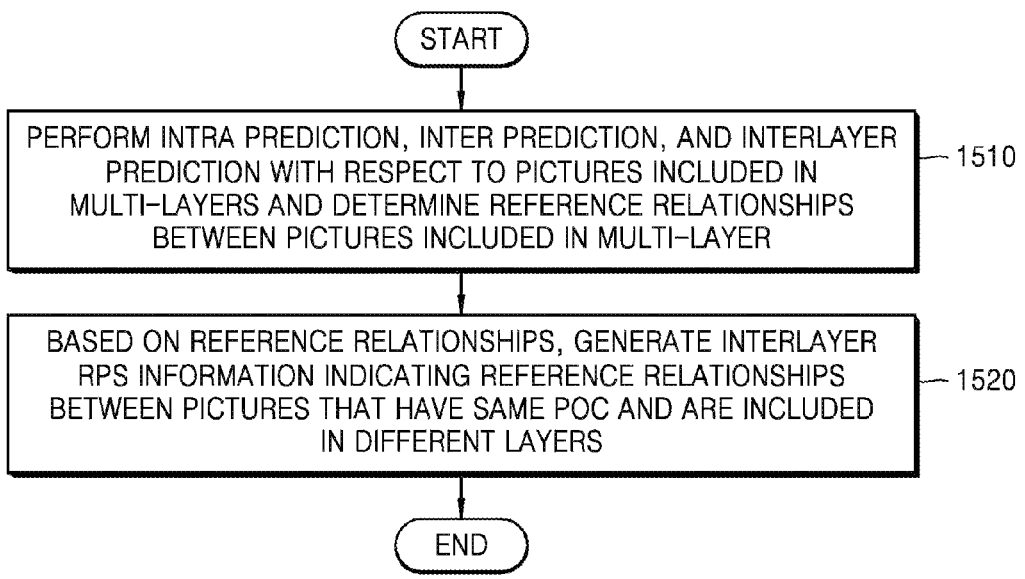
FIG. 15 is a flowchart showing a method of encoding multi-layer video, according to an exemplary embodiment.

FIG. 15 is a flowchart showing a method of encoding multi-layer video, according to an exemplary embodiment.

Referring to FIGS. 14 and 15, in an operation 1510, the video encoder 1410 performs intra predictions, inter predictions and interlayer predictions with respect to pictures included in multi-layers and determines reference relationships between the pictures included in the multi-layers.

In an operation 1520, the RPS information generator 1420 generates RPS information, which is information regarding reference pictures referenced by the respective pictures, based on reference relationships, an encoding sequence, and an outputting sequence between multi-layer pictures. As described above, RPS information regarding each picture may be included in the slice header of each picture and transmitted. The RPS information generator 1420 may generate first short-term RPS information RefPicSetStCurrBefore, second short-term RPS information RefPicSetStCurrAfter, third short-term RPS information RefPicSetStFoll, first long-term RPS information RefPicSetLtCurr, and second long-term RPS information RefPicSetLtFoll with respect to each of the pictures included in the multi-layers and add the generated information to the slice header of a current picture. Furthermore, the RPS information generator 1420 may generate interlayer RPS information regarding reference pictures that have a same POC as a current picture, are included in different layers, and are to be referenced for inter layer prediction of the current picture and may add the interlayer RPS information to the slice header of the current picture.

Figure 16:
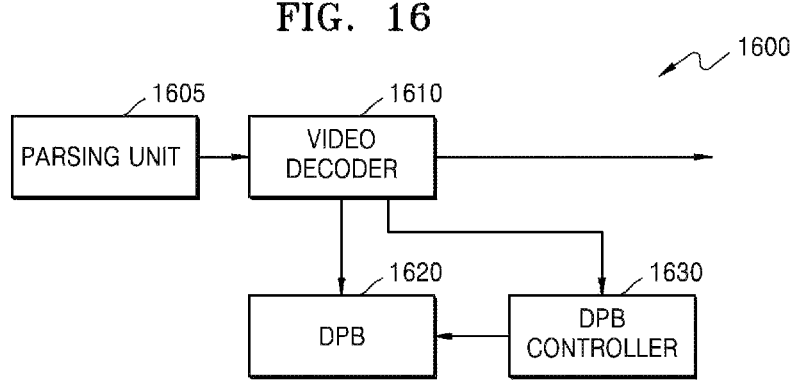
FIG. 16 is a block diagram of a multi-layer video decoding apparatus according to an exemplary embodiment.

FIG. 16 is a block diagram of a multi-layer video decoding apparatus 1600 according to an exemplary embodiment.

Referring to FIG. 16, the multi-layer video decoding apparatus 1600 includes a parsing unit 1605, a video decoder 1610, a DPB 1620, and a DPB controller 1630.

The parsing unit 1605 receives an encoded bitstream and obtains a video parameter set (VPS), a sequence parameter set (SPS), a picture parameter set (PPS), a slice, and an SEI message from the bitstream. Particularly, the parsing unit 1605 obtains RPS information for determining referring relationships between pictures included in encoded multi-layers from the bitstream. RPS information is included in the slice header of each picture, and RPS information is decoded before each picture is decoded.

RPS information may include interlayer RPS information indicating referring relationships for interlayer prediction between pictures of multi-layers that are included in a single AU and have a same POC. In other words, interlayer RPS information includes information regarding reference pictures that are referred by a current picture for interlayer prediction. Furthermore, RPS information may include first short-term RPS information RefPicSetStCurrBefore, second short-term RPS information RefPicSetStCurrAfter, third short-term RPS information RefPicSetStFoll, first long-term RPS information RefPicSetLtCurr, and second long-term RPS information RefPicSetLtFoll.

The AU refers to a group of pictures existing at a same time band, where pictures in a same AU may have a same picture output sequence (POC).

The video decoder 1610 decodes pictures included in multi-layers. The video decoder 1610 determines referring relationships between multi-layer pictures by generating a list of reference pictures based on RPS information obtained from a bitstream and decodes pictures based on prediction modes of the respective pictures. The video decoder 1120 may decode multi-layer video based on encoding units having a tree structure.

The decoded picture buffer (DPB) 1620 may store decoded pictures. For example, after the video decoder 1610 decodes pictures, decoded pictures may be stored in the DPB 1620. The multi-layer video decoding apparatus 1600 may sequentially output decoded pictures to display the pictures or may use decoded pictures stored in the DPB 1620 as reference pictures for decoding inter predicted or interlayer predicted pictures.

A process for managing the DPB 1620 to effectively use memory of the DPB 1620 may include a process for storing decoded images in the DPB 1620, a process for marking reference pictures, and a process for outputting and deleting decoded pictures from the DPB 1620.

The video decoder 1610 may obtain a reference picture set (RPS) from data parsed by the parsing unit 1605. Reference pictures included in the RPS may be generally categorized as short-term reference pictures and long-term reference pictures. A long-term reference picture may be stored in the DPB 1620 for longer period of time than a short-term reference picture. Processing a long-term reference picture may be more complicated and take longer period of time than processing a short-term reference picture.

A picture stored in the DPB 1620 may be identified by at least one from between frame number and POC value of the corresponding picture. Furthermore, in terms of encoding multi-layer video, pictures stored in the DPB 1620 may be identified by frame numbers and POC values and layers of the pictures or information for identifying viewpoints.

After the video decoder 1610 obtains a RPS, the 1610 may construct a reference picture list. The video decoder 1610 may prediction-decode a current picture based on reference pictures identified in the reference picture list. A reference picture list may use reference picture index to reduce reference picture information transmitted by prediction unit (PU).

Up to two reference picture lists may be used based on type of slice, and information for distinguishing two lists (a reference picture list 0 and a reference picture list 1) from each other may be transmitted via a RPS.

For example, one reference picture list may be constructed with respect to P slices for unidirectional prediction or some B slices for unidirectional prediction. Meanwhile, two reference picture lists may be constructed with respect to B slices for bi-directional prediction.

Hereinafter, an example that a picture decoded by the video decoder 1610 is marked based on interlayer RPS information according to an exemplary embodiment will be described.

According to an exemplary embodiment, an picture decoded by the video decoder 1610 may be stored in the DPB 1620. When a decoded picture is initially stored in the DPB 1620, the DPB controller 1630 may mark the decoded picture as a short-term reference picture by default. A picture marked as a short-term reference picture may be marked as a long-term reference picture or a picture not to be used as a reference picture, based on RPS information included in the slice headers of pictures decoded thereafter.

According to an exemplary embodiment, a picture encoded via interlayer prediction may be predicted with reference to pictures of other layers that are previously encoded and decoded. A first layer picture is initially decoded and stored in the DPB 1620, and the DPB controller 1630 marks the first layer picture as a short-term reference picture by default. If a second layer picture having a same POC as the first layer picture is interlayer predicted with reference to the first layer picture, it is attempted to refer to the first layer picture stored in the DPB 1620 to decode the second layer picture. The DPB controller 1630 marks the first layer picture, which is marked as a short-term reference picture, as a long-term reference picture based on interlayer RPS information regarding the second layer picture. The interlayer RPS information may include layer identification information regarding reference pictures of the second layer picture or pictures that are decoded after the second layer picture and have a same POC value as the second layer picture. Based on interlayer RPS information, a picture stored in the DPB 1620 may be marked.

In detail, before decoding the second layer picture, the DPB controller 1630 obtains interlayer RPS information regarding reference pictures of the second layer picture and pictures that are decoded after the second layer picture and have a same POC value as the second layer picture from the slice header of the second layer picture. The DPB controller 1630 may mark the first layer picture, which is marked as a short-term reference picture and is stored in the DPB 1620, as a long-term reference picture based on interlayer RPS information regarding pictures of other layers having a same POC value. In other words, if the first layer picture is used as a reference picture for interlayer prediction of a picture of another layer, the DPB controller 1630 may change reference status of the first layer picture from a short-term reference to a long-term reference.

Furthermore, the DPB controller 1630 may obtain information indicating whether a first layer picture is used as a reference picture for interlayer prediction when the first layer picture is interlayer predicted. Information indicating whether the first layer picture is used as a reference picture for interlayer prediction may include a flag InterlayerPredictionFlag indicating whether pictures of each layer are used as reference picture for interlayer prediction of pictures of other layers.

When a first layer picture is decoded, the DPB controller 1630 may mark the first layer picture as a long-term reference picture based on information indicating whether the decoded first layer picture is used as a reference picture for interlayer prediction. For example, if value of InterlayerPredictionFlag regarding the first layer picture is 1, the DPB controller 1630 may mark reference status of the first layer picture as long-term reference when the first layer picture is decoded and stored in the DPB 1620. When all of encoded pictures in a current AU are decoded, the first layer picture, which is marked for long-term reference, may be marked as a short-term reference picture.

The flag InterlayerPredictionFlag indicating whether a first layer picture is used as a reference picture for interlayer prediction of pictures of other layers may be determined based on at least one from between picture quality of the first layer picture and temporal identification TemporalId of the first layer picture.

For example, if value of TemporalId regarding a first layer picture is equal to or less than a designated reference value max_tid_il_ref_pic_plus1−1 or max_sublayer_for_ilp_plus1−1, InterlayerPredictionFlag may obtain value of 1. On the contrary, if value of TemporalId regarding a first layer picture is greater than the designated reference value max_tid_il_ref_pic_plus1−1 or max_sublayer_for_ilp_plus1−1 of the designated reference value max_tid_il_ref_pic_plus1−1 or max_sublayer_for_ilp_plus1−1 has value of 0, InterlayerPredictionFlag may have value of 0.

The temporal identification TemporalId may be a hierarchical value indicating pictures that can be used for encoding or decoding a current picture. A picture having a particular temporal identification may be used as a reference picture for a picture having a same or greater temporal identification. For example, a picture having temporal identification of 1 may be used as a reference picture for a picture having temporal identification of 1 or temporal identification greater than 1 (e.g., 2, 3, etc.). However, a picture having temporal identification of 1 may not be used as a reference picture for a picture having temporal identification of 0.

Smaller temporal identification may mean smaller display rate. For example, if the video decoder 1610 decodes pictures having temporal identification of 0 only, a display rate may be 7.5 pictures per second. Meanwhile, if the video decoder 1610 decodes pictures having temporal identifications of 0 and 1, a display rate may be 15 pictures per second.

Furthermore, a RPS regarding a current picture may not include pictures having greater temporal identifications than the current picture, such that pictures having temporal identifications equal to or less than a particular temporal identification may be decoded based on temporal up-switching.

The TemporalId of a first layer picture may include a temporal identification to which the first layer picture belongs. The smaller the InterlayerPredictionFlag of the first layer picture, the less likely the first layer picture becomes a picture discarded during transmission based on temporal down-switching. In other words, as the InterlayerPredictionFlag of the first layer picture becomes smaller, it may be determined that of the first layer picture has better picture quality or is more important. Therefore, according to an exemplary embodiment, a picture having TemporalId smaller than a reference value may be determined as a picture that can be referenced during interlayer prediction.

From among decoded pictures that are marked as 'not to be referred,' pictures having InterlayerPredictionFlag of 0 due to TemporalId greater than a reference value may be immediately marked as 'not to be referred.' Pictures having large TemporalId values have low picture quality or low importance, and thus the corresponding pictures may not be referenced. However, such the pictures may be referred at higher layers, and thus the pictures are not immediately marked as 'not to be referred.' However, if InterlayerPredictionFlag of a picture is 0, the picture corresponds to a picture that is not referenced between layers during interlayer prediction, and thus the corresponding picture may be immediately marked as 'not to be referred' and deleted from a DPB. Therefore, because a picture can be deleted before RPS information regarding a next picture to be decoded is obtained, size of a DPB may be minimized.

As described above, the reason that a first layer picture marked as a short-term reference picture is changed to a long-term reference picture when the first layer picture is used as a reference picture during interlayer prediction is that an error occurs while an predicted motion vector is being scaled based on a POC difference when a picture marked as a short-term reference picture is used as a reference picture. For example, if a predicted motion vector is referred to as motion vector predictor (mvp), POC of a current picture is referred to as POC1, and POC of a short-term reference picture is referred to as POC2, motion vector of the current picture referring to the short-term reference picture is obtained via a scaling process including a division process using a POC difference, e.g., (mvp/(POC1−POC2)). However, because a current picture and a reference picture have a same POC during interlayer prediction, (POC1−POC2) is 0. Therefore, if a reference picture having a same POC as a current picture is used as a short-term reference picture, an error may occur during determination of motion vector of the current picture. On the contrary, in case of using a reference picture marked as a long-term reference picture, a motion vector of a current picture is not obtained via a scaling process, but obtained based on separate information. Therefore, if a decoded current picture can be interlayer predicted with reference to a picture of another layer having a same POC, the DPB controller 1630 changes a reference picture marked as a short-term reference picture to a long-term reference picture.

The video decoder 1610 performs interlayer prediction regarding a second layer picture with reference to the first reference picture marked as a long-term reference picture, thereby restoring the second layer picture. After the second layer picture is decoded, the video decoder 1610 may mark the first layer picture, which is marked as a long-term reference picture, as a short-term reference picture again. Therefore, when pictures having a different POC in a next AU are decoded, reference status of the first layer picture marked as a short-term reference picture may be updated, and then the first layer picture may be referred by the pictures having the different POC.

According to an exemplary embodiment, a first layer picture marked as a long-term reference picture may be marked as a short-term reference picture again after a second layer picture is restored, based on whether a second layer to which the second layer picture belongs is the base layer. It may be determined whether the second layer is the base layer based on whether nuh_layer_id of the second layer picture has a value greater than 0. In other words, when the second layer is not the base layer and the second layer picture is decoded as interlayer prediction is performed with reference to the first layer picture marked as a long-term reference picture, the first layer picture may again be marked as a short-term reference picture. Because interlayer prediction is not performed with respect to pictures of the base layer, when interlayer prediction is performed with respect to a second layer picture and the second layer is not the base layer, a first layer picture used as a reference picture for the interlayer prediction of the second layer picture may again be marked as a short-term reference picture.

The reason that a first layer picture used as a reference picture during interlayer prediction is changed from a long-term reference picture to a short-term reference picture is to mark the first layer picture to not to be used later stage or a long-term reference picture based on RPS information obtained from the slice header of another picture. It may not be allowed to change a picture belonging to a current AU from a long-term reference picture to a short-term reference picture based on RPS information obtained from the slice header of a picture belonging to another AU, and thus a first layer picture may be marked as a short-term reference picture before a picture is marked based on RPS information.

However, if a first layer picture is used as a reference picture for interlayer prediction of two or more pictures belonging to a same AU, a process for marking the first layer picture as a long-term reference picture from a short-term reference picture and a process for marking the first layer picture as a short-term reference picture from a long-term reference picture after the pictures are decoded may be repeatedly performed.

Therefore, if a first layer picture is used as a reference picture for interlayer prediction of one or more pictures included in a same AU, the DPB controller 1630 according to an exemplary embodiment may mark the first layer picture as a long-term reference picture. For example, the DPB controller 1630 may mark a first layer picture as a long-term reference picture based on information InterlayerPredictionFlag indicating whether the first layer picture is included in interlayer RPS information regarding one or more pictures included in a same AU or whether the first layer picture is used as a reference image for interlayer prediction of other pictures included in a same AU. Furthermore, the DPB controller 1630 may mark the first layer picture as a short-term reference picture from a long-term reference picture after at least one of pictures included in a same AU other than the first layer picture is decoded. For example, the DPB controller 1630 may mark the first layer picture as a short-term reference picture from a short-term reference picture after all pictures included in a same AU are decoded.

Furthermore, to prevent repetition of marking a first reference picture from a short-term reference picture as a long-term reference picture based on interlayer RPS information and marking from a long-term reference picture as a short-term reference picture after a picture is decoded, a decoded first layer picture may be marked as a long-term reference picture by default. In other words, when the video decoder 1610 initially stores a decoded image in the DPB 1620, the DPB controller 1630 may mark the decoded picture as a long-term reference picture instead of a short-term reference picture by default.

Picture of other layers having a same POC as a first layer picture marked as a long-term reference picture may be interlayer predicted with reference to the first layer picture based on information regarding reference pictures. Furthermore, the first layer picture marked as a long-term reference picture may be marked as a short-term reference picture or may be marked to not to be used as a reference picture based on RPS information of the slice header of a picture having a POC different from that of the first layer picture or belonging to an AU different from that of the first layer picture. For example, if a first layer picture may be used as a reference picture based on RPS information regarding a different AU, the first layer picture may be marked as a short-term reference picture or may be maintained as a long-term reference picture. Furthermore, if a first layer picture is not used as a reference picture based on RPS information regarding a different AU, the first layer picture may be marked to not to be used as a reference picture and the first layer picture may be deleted from the DPB 1620.

Hereinafter, referring to FIGS. 17 through 21, methods of decoding multi-layer video according to an exemplary embodiment or other embodiments of the present invention will be described.

Figure 17:
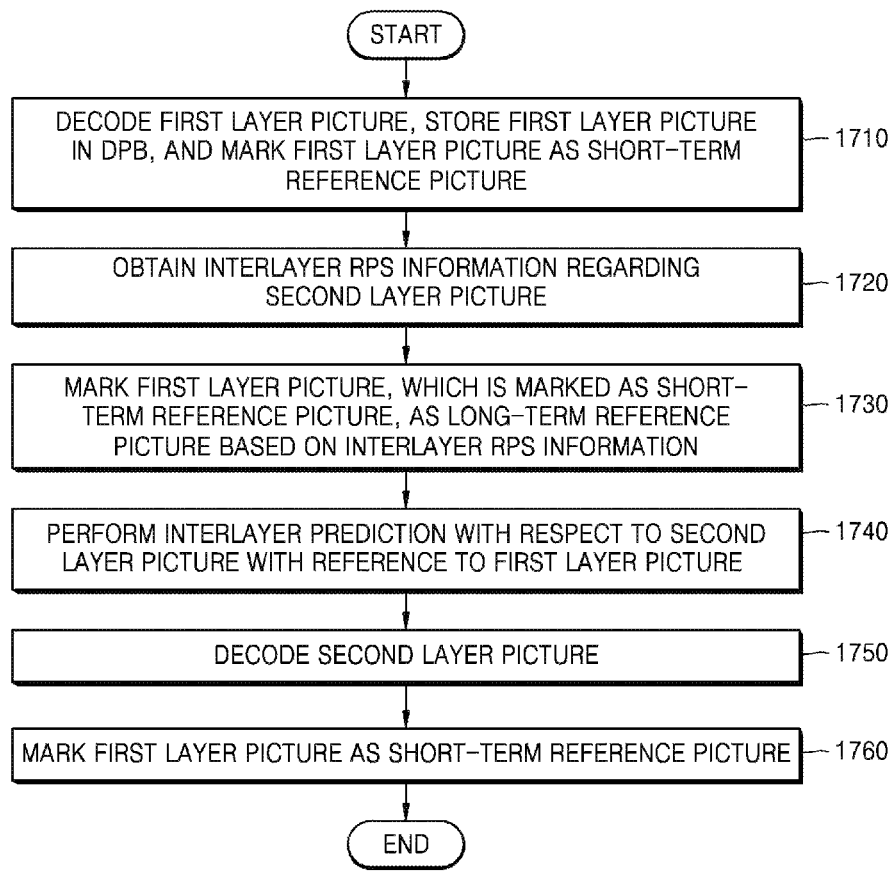
FIGS. 17 and 18 are flowcharts of methods of decoding multi-layer video according to an exemplary embodiment.
Figure 18:
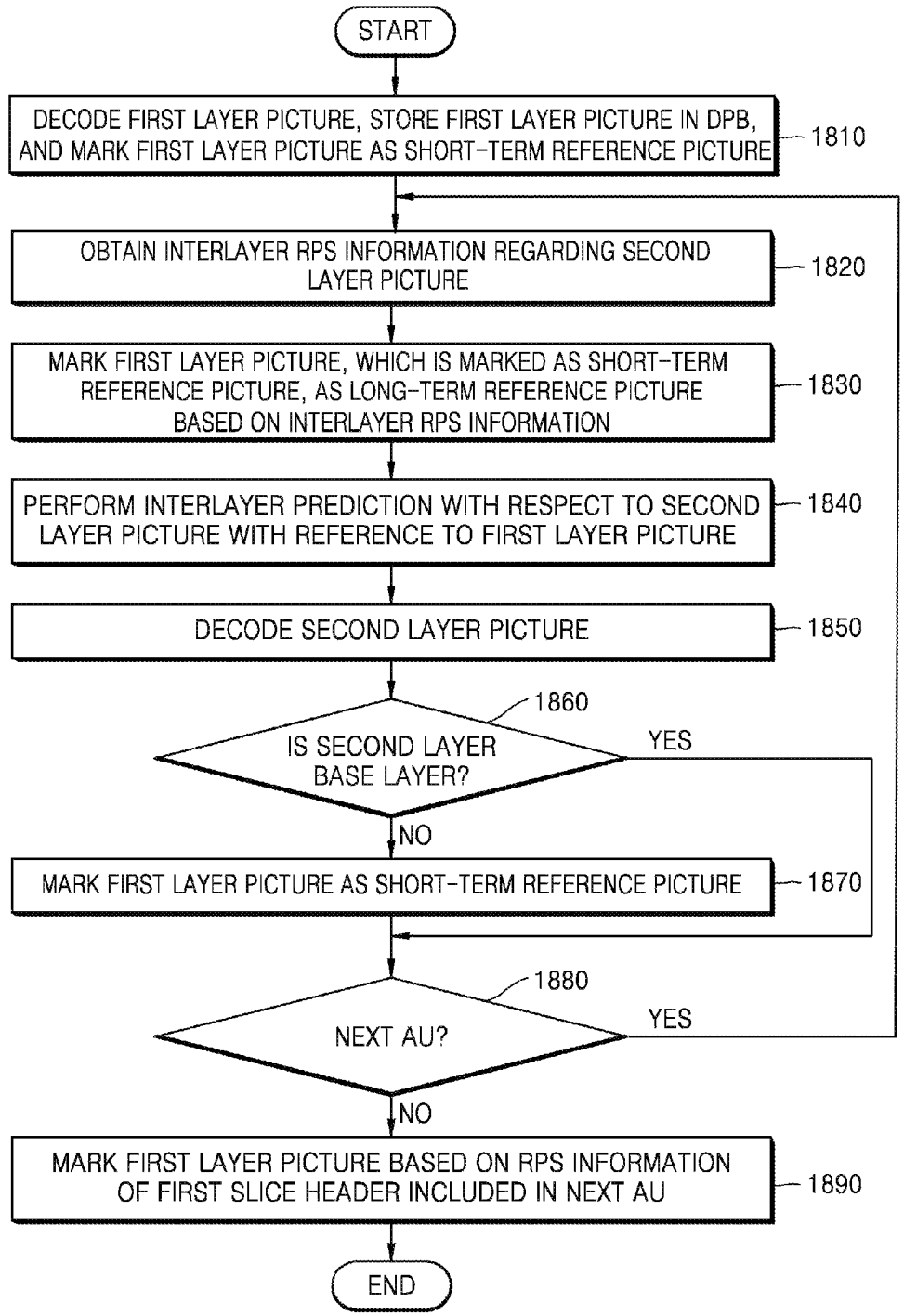

FIGS. 17 and 18 are flowcharts showing a method of decoding multi-layer video according to an exemplary embodiment.

Referring to FIGS. 16 and 17, in an operation 1710, the video decoder 1610 decodes a first layer picture and stores in the DPB 1620, and the DPB controller 1630 marks the decoded first layer picture as a short-term reference picture.

In an operation 1720, the parsing unit 1605 obtains interlayer RPS information regarding a second layer picture having a same first POC as the first layer picture. The interlayer RPS information regarding the second layer picture may include information regarding reference pictures referred during interlayer prediction of the second layer picture and pictures decoded after the second layer picture.

For example, interlayer RPS information may include layer information regarding reference pictures referred during interlayer prediction.

In an operation 1730, the DPB controller 1630 marks the first layer picture, which is marked as a short-term reference picture, as a long-term reference picture based on the interlayer RPS information. In detail, if layer information RefLayerId regarding reference pictures included in interlayer RPS information of the second layer picture includes layer information nuh_layer_id regarding the first layer picture, the DPB controller 1630 may mark the first layer picture from a short-term reference picture as a long-term reference picture.

In an operation 1740, if the first layer picture is referred to decode the second layer picture, the video decoder 1610 may perform interlayer prediction with respect to the second layer picture with reference to the first layer picture.

In an operation 1750, the video decoder 1610 may decode the second layer picture by performing interlayer prediction. The decoded second layer picture is stored in the DPB 1620 like the first layer picture in the operation 1710 and may be marked as a short-term reference picture.

In an operation 1760, the DPB controller 1630 may mark the first layer picture as a short-term reference picture after the second layer picture is decoded. In the same regard, in case of the second layer picture, if the second layer picture is marked as a long-term reference picture like the first layer picture based on interlayer RPS information regarding other pictures, the second layer picture may be marked as a short-term reference picture after an interlayer predicted picture is decoded with reference to the second layer picture.

The reason that a first layer picture used as a reference picture is marked from a long-term reference picture as a short-term reference picture is to mark the first layer picture as a long-term reference picture or to not to be used later as a reference picture based on RPS information obtained from the slice header of another picture. If a picture is marked based on RPS information obtained from the slice header of another picture, it may not be allowed to mark a picture from a long-term reference picture as a short-term reference picture, and thus a first layer picture may be marked as a short-term reference picture before a picture is marked based on RPS information.

Unlike FIG. 17, FIG. 18 shows a method of decoding multi-layer video in a case where there are two or more pictures that have a same first POC as a first layer picture and are interlayer predicted with reference to the first layer picture.

Referring to FIGS. 16 and 18, in an operation 1810, the video decoder 1610 decodes a first layer picture and stores in the DPB 1620, and the DPB controller 1630 marks the decoded first layer picture as a short-term reference picture.

In an operation 1820, the parsing unit 1605 obtains interlayer RPS information regarding a second layer picture having a same first POC as the first layer picture. The interlayer RPS information regarding the second layer picture may include information regarding reference pictures referred during interlayer prediction of the second layer picture and pictures decoded after the second layer picture. For example, interlayer RPS information may include layer information regarding reference pictures referred during interlayer prediction.

In an operation 1830, the DPB controller 1630 marks the first layer picture, which is marked as a short-term reference picture, as a long-term reference picture based on the interlayer RPS information. In detail, if layer information RefLayerId regarding reference pictures included in interlayer RPS information of the second layer picture includes layer information nuh_layer_id regarding the first layer picture, the DPB controller 1630 may mark the first layer picture from a short-term reference picture as a long-term reference picture.

In an operation 1840, if the first layer picture is referenced to decode the second layer picture, the video decoder 1610 may perform interlayer prediction with respect to the second layer picture with reference to the first layer picture.

In an operation 1850, the video decoder 1610 may decode the second layer picture by performing interlayer prediction. The decoded second layer picture is stored in the DPB 1620 like the first layer picture in the operation 1810 and may be marked as a short-term reference picture.

In an operation 1860, the DPB controller 1630 may determine whether the second layer picture is the base layer. If the second layer picture is not the base layer, the DPB controller 1630 may mark the first layer picture, which is marked as a long-term reference picture, as a short-term reference picture in an operation 1870. If no interlayer prediction is performed with respect to the base layer, no further operation after the operation 1860 corresponding to 'Yes' (although shown in FIG. 18) is performed.

In the same regard, in case of the second layer picture, if the second layer picture is marked as a long-term reference picture like the first layer picture based on interlayer RPS information regarding other pictures, the second layer picture may be marked as a short-term reference picture after an interlayer predicted picture belong to a non-base layer is decoded with reference to the second layer picture.

The reason that a first layer picture used as a reference picture is marked from a long-term reference picture as a short-term reference picture is to mark the first layer picture as a long-term reference picture or to not to be used later as a reference picture based on RPS information obtained from the slice header of another picture. If a picture is marked based on RPS information obtained from the slice header of another picture, it may not be allowed to mark a picture from a long-term reference picture as a short-term reference, and thus a first layer picture may be marked as a short-term reference picture before a picture is marked based on RPS information.

In an operation 1880, the DPB controller 1630 may determine whether pictures included in an AU next to a current AU are being decoded. In other words, it may be determined whether pictures of the current AU are completely decoded and pictures of the next AU are being decoded.

If pictures of the next AU are being decoded, in an operation 1890, the DPB controller 1630 may mark a first layer picture based on RPS information from the first slice header included in the next AU. In other words, the first layer picture may be marked as a short-term reference picture, a long-term reference picture, or a picture not to be used as a reference picture based on RPS information from the first slice header included in the next AU.

On the other hand, if an encoded picture of the current AU exists in the operation 1880, the parsing unit 1605 may use the encoded picture as the second layer picture for the operations 1820 through 1880 in the operation 1820 and may obtain interlayer RPS information regarding the encoded picture. The first layer picture for the operations 1820 through 1880 may also be at least one picture from among pictures stored in the DPB 1620. In other words, the multi-layer video decoding apparatus 1600 may perform the operations 1820 through 1870 by using an encoded picture belonging to a current AU as a second layer picture and at least one picture referred during interlayer prediction of the second layer picture as a first layer picture.

A first layer picture according to an exemplary embodiment may be at least one picture from among pictures stored in the DPB 1620 used as reference pictures for interlayer prediction of the second layer picture to be decoded.

The operations 1820 through 1880 may be repeated until all of pictures belonging to a current AU are decoded.

Figure 19:
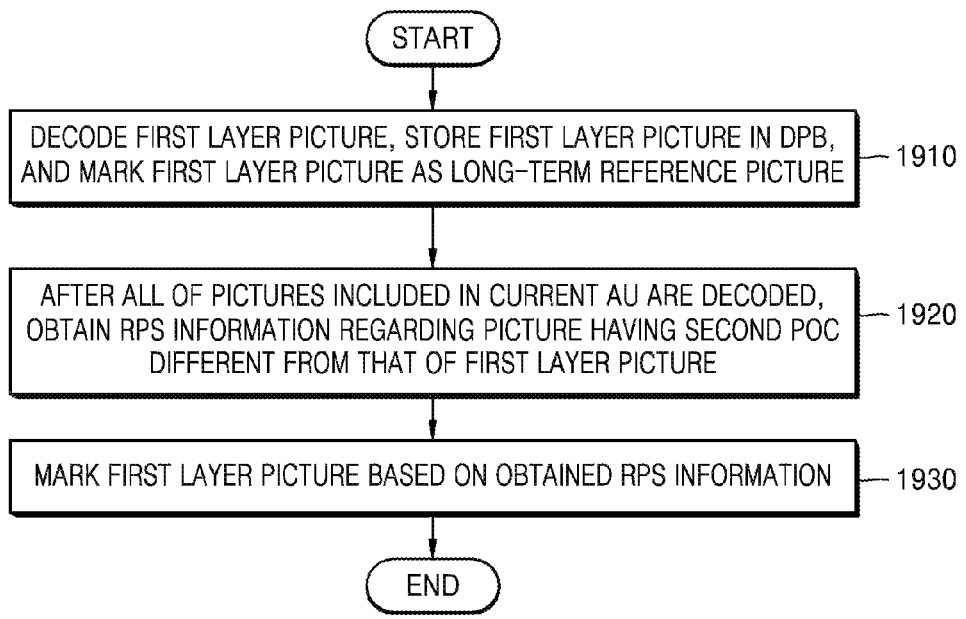
FIG. 19 is a flowchart of a method of decoding multi-layer video according to an exemplary embodiment.

FIG. 19 is a flowchart showing a method of decoding multi-layer video according to another embodiment of the present invention. According to the method of decoding multi-layer video, a decoded first layer picture may be marked as a long-term reference picture by default.

Referring to FIGS. 16 and 19, in an operation 1910, the video decoder 1610 decodes a first layer picture and stores in the DPB 1620, and the DPB controller 1630 marks the decoded first layer picture as a long-term reference picture.

If the first layer picture is referred to decode a second layer picture, the video decoder 1610 performs interlayer prediction regarding the second layer picture with reference to the first layer picture. The video decoder 1610 may perform interlayer prediction regarding the second layer picture with reference to the first layer picture based on an interlayer reference picture list obtained from interlayer RPS information regarding the second layer picture. If the second layer picture may be interlayer predicted with reference to two or more pictures, the first layer picture may be two or more pictures.

The video decoder 1610 may decode the second layer picture by performing interlayer prediction. Like the first layer picture of the operation 1910, the decoded second layer picture may be marked as a long-term reference picture, and the second layer picture marked as a long-term reference picture may be used as a reference picture when interlayer prediction is performed later to a picture of another layer.

In an operation 1920, the DPB controller 1630 may determine whether pictures included in an AU next to a current AU are being decoded after all of pictures included in the current AU are decoded and may obtain RPS information regarding the pictures belonging to the next AU. In other words, it may be determined whether pictures of the current AU are completely decoded and pictures of the next AU are being decoded.

If pictures of the next AU are being decoded, in an operation 1950, the DPB controller 1630 may mark a first layer picture based on RPS information from the first slice header included in the next AU. In other words, the first layer picture may be marked as a short-term reference picture, a long-term reference picture, or a picture not to be used as a reference picture based on RPS information from the first slice header included in the next AU.

FIG. 20 is a flowchart showing a method of decoding multi-layer video based on interlayer RPS information, according to an exemplary embodiment.

Referring to FIGS. 16 and 20, in an operation 2010, the video decoder 1610 decodes a first layer picture and stores in the DPB 1620, and the DPB controller 1630 marks the decoded first layer picture as a short-term reference picture.

In an operation 2020, the parsing unit 1605 obtains interlayer RPS information regarding a second layer picture having a same first POC as the first layer picture. The interlayer RPS information regarding the second layer picture may include information regarding reference pictures referred during interlayer prediction of the second layer picture and pictures decoded after the second layer picture.

For example, interlayer RPS information may include layer information regarding reference pictures referred during interlayer prediction.

In an operation 2030, the DPB controller 1630 marks the first layer picture, which is marked as a short-term reference picture, as a long-term reference picture based on the interlayer RPS information. In detail, if layer information RefLayerId regarding reference pictures included in interlayer RPS information regarding the second layer picture includes layer information nuh_layer_id regarding the first layer picture, the DPB controller 1630 may mark the first layer picture from a short-term reference picture as a long-term reference picture. If the first layer picture is already marked as a long-term reference picture, the first layer picture may be maintained as a long-term reference picture.

In an operation 2040, if the first layer picture is referred to decode the second layer picture, the video decoder 1610 may perform interlayer prediction with respect to the second layer picture with reference to the first layer picture.

In an operation 2050, the video decoder 1610 may decode the second layer picture by performing interlayer prediction. The decoded second layer picture is stored in the DPB 1620 like the first layer picture in the operation 2010 and may be marked as a short-term reference picture. Like the first layer picture from the operation 2010, when interlayer prediction is performed with respect to other pictures, the decoded second layer picture may be marked as a long-term reference picture based on interlayer RPS information regarding the respective pictures and used as a reference picture for the interlayer prediction.

In an operation 2060, the DPB controller 1630 may determine whether at least one picture from among encoded pictures of the respective layers belonging to a current AU is decoded. If at least one picture or all of encoded pictures of the respective layers belonging to the current AU are not decoded, the multi-layer video decoding apparatus 1600 may perform operations from the operation 2020 by using an encoded picture as the second layer picture and using at least one picture referred during interlayer prediction of the second layer picture as the first layer picture, in operation 2065 and subsequent operations.

If it is determined that at least one picture or all of encoded pictures of the respective layers belonging to the current AU are decoded, the DPB controller 1630 may mark the first layer picture as a short-term reference picture in an operation 2060.

The operations 2020 through 2060 may be repeated until at least one or all of pictures belonging to a current AU are decoded.

If pictures of the next AU are being decoded, in an operation 2080, the DPB controller 1630 may mark a first layer picture based on RPS information from the first slice header included in the next AU. In other words, the first layer picture may be marked as a short-term reference picture, a long-term reference picture, or a picture not to be used as a reference picture based on RPS information from the first slice header included in the next AU.

Figure 21A:
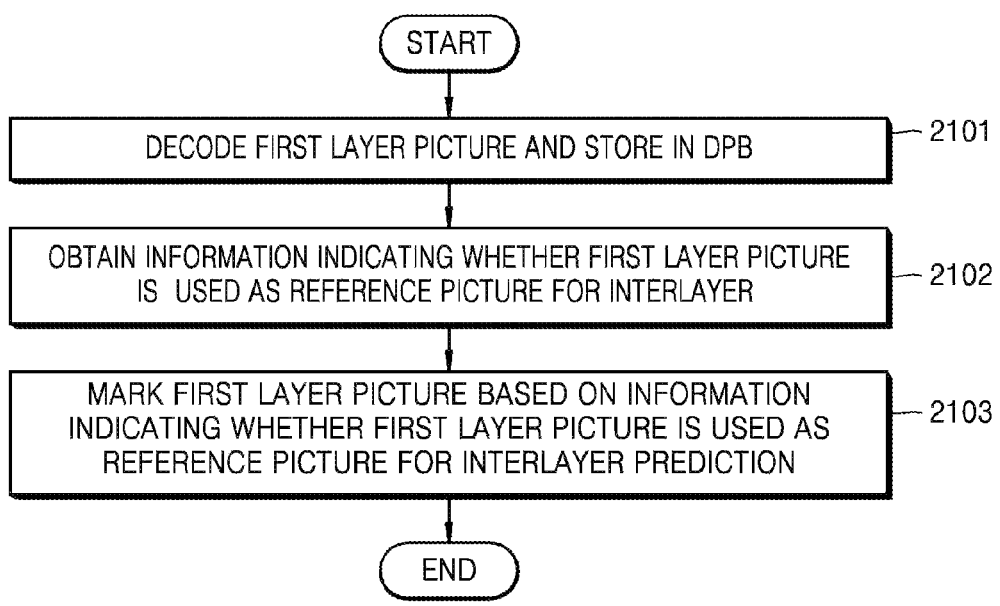
FIGS. 21A and 21B are flowcharts of methods of decoding multi-layer video based on an interlayer prediction flag, according to an exemplary embodiment.

FIG. 21A is a flowchart showing a method of decoding multi-layer video based on an interlayer prediction flag, according to an exemplary embodiment.

Referring to FIGS. 16 and 21A, in an operation 2101, the video decoder 1610 decodes a first layer picture and stores in the DPB 1620.

In an operation 2102, the parsing unit 1605 may obtain information indicating whether the first layer picture is used as a reference picture for interlayer prediction regarding pictures of other layers having a same POC value as the first layer picture.

In an operation 2103, the DPB controller 1630 may mark the first layer picture based on the information obtained in the operation 2102. The first layer picture may be marked as a long-term reference picture, a short-term reference picture, or a picture not to be used as a reference picture, based on the information obtained in the operation 2102.

Figure 21B:
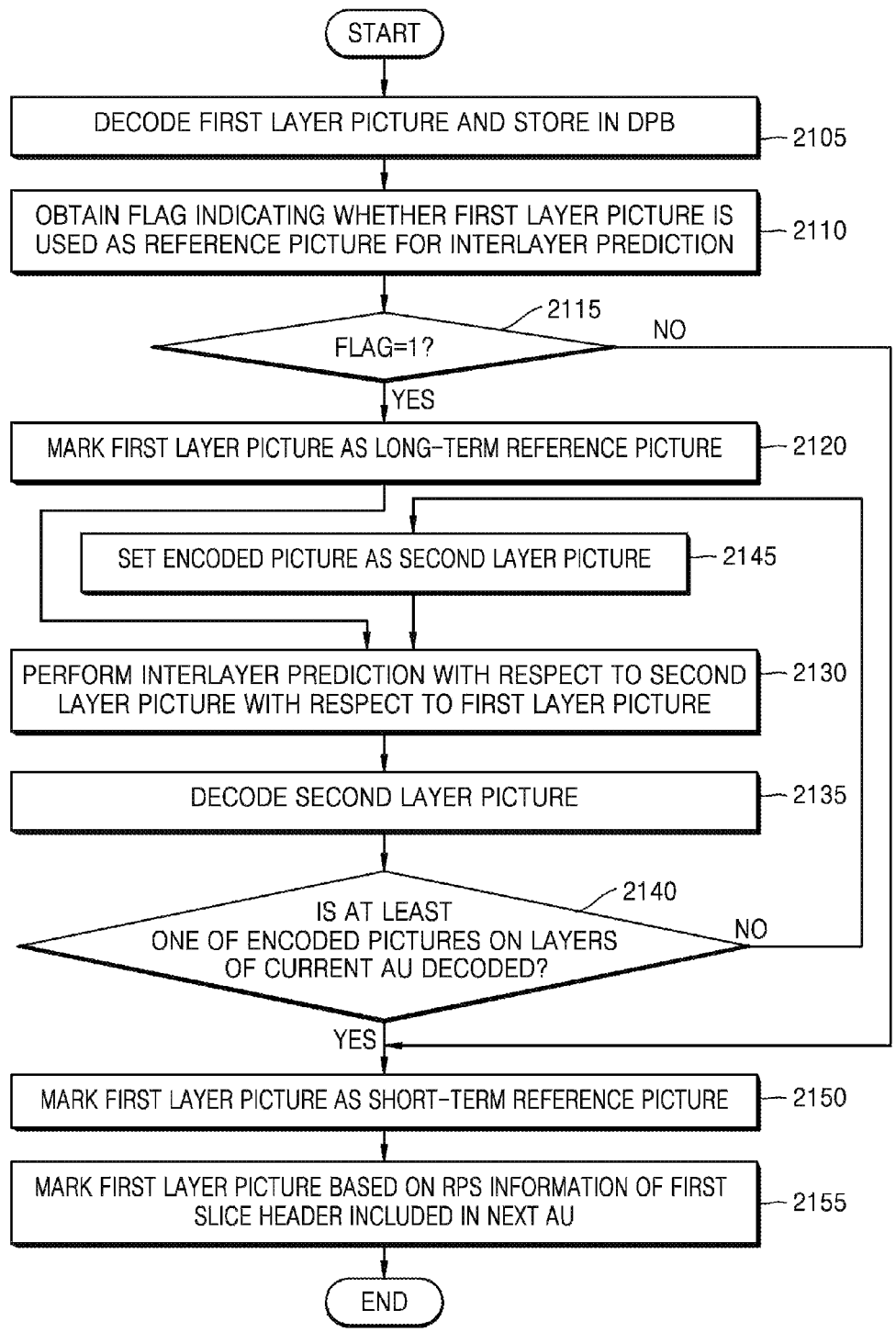

FIG. 21B is a flowchart showing a method of decoding multi-layer video based on an interlayer prediction flag, according to an exemplary embodiment.

Referring to FIGS. 16 and 21B, in an operation 2105, the video decoder 1610 may decode a first layer picture and store in the DPB 1620.

In an operation 2110, the parsing unit 1605 may obtain a flag InterlayerPredictionFlag indicating whether the first layer picture is used as reference picture for interlayer prediction of pictures of other layers.

In an operation 2115, if value of the flag obtained in the operation 2110 is 1, the first layer picture may be used as a reference picture for interlayer prediction of pictures of other layers, and thus the DPB controller 1630 may mark the first layer picture as a long-term reference picture in an operation 2120.

In the operation 2115, if value of the flag obtained in the operation 2110 is 0, the first layer picture is not used as a reference picture for interlayer prediction of pictures of other layers, and thus the DPB controller 1630 may mark the first layer picture as a short-term reference picture in an operation 2150. The first layer picture marked as a short-term reference picture may be marked in an operation 2155 based on RPS information from the slice header of a next AU. Alternatively, the first layer picture having flag value of 0 may be considered as a picture inappropriate to be used as a reference picture for interlayer prediction, and thus the first layer picture may be marked as a picture not to be used as a reference picture and deleted from the DPB 1620. In other words, a picture having flag value of 0 may be marked as a short-term reference picture or a picture not to be used as a reference picture.

In an operation 2130, if the first layer picture is referred to decode the second layer picture, the video decoder 1610 may perform interlayer prediction with respect to the second layer picture with reference to the first layer picture.

In an operation 2135, the video decoder 1610 may decode the second layer picture by performing interlayer prediction. The decoded second layer picture is stored in the DPB 1620 like the first layer picture in the operation 2105. Like the first layer picture from the operation 2105, based on whether the decoded second layer picture is used as a reference picture when interlayer prediction is performed with respect to other pictures, the decoded second layer picture may be marked as a long-term reference picture and used as a reference picture for the interlayer prediction.

In an operation 2140, the DPB controller 1630 may determine whether at least one picture from among encoded pictures of the respective layers belonging to a current AU is decoded. If at least one picture or all of encoded pictures of the respective layers belonging to the current AU are not decoded, in an operation 2145, the multi-layer video decoding apparatus 1600 may perform operations from the operation 2130 by using an encoded picture as the second layer picture and using at least one picture referred during interlayer prediction of the second layer picture as the first layer picture.

If it is determined that at least one picture or all of encoded pictures of the respective layers belonging to the current AU are decoded, the DPB controller 1630 may mark the first layer picture as a short-term reference picture in an operation 2150. Furthermore, the DPB controller 1630 may mark not only the first layer picture, but also pictures having flag value of 1 obtained in the operation 2110 as short-term reference pictures in the operation 2150.

The operations 2130 through 2140 may be repeated until at least one or all of pictures belonging to a current AU are decoded.

If pictures of the next AU are being decoded, in an operation 2155, the DPB controller 1630 may mark a first layer picture based on RPS information from the first slice header included in the next AU. In other words, the first layer picture may be marked as a short-term reference picture, a long-term reference picture, or a picture not to be used as a reference picture based on RPS information from the first slice header included in the next AU.

Hereinafter, RPS information used for determining reference picture status of pictures previously decoded and stored in a DPB according to an exemplary embodiment will be described in detail.

RPS is information for managing pictures previously decoded and stored in a DPB. Pictures previously decoded and stored in a DPB may no longer be used as reference pictures as decoding progresses. In consideration of limited capacity of a DPB, it is necessary to efficiently manage decoded pictures stored in the DPB during a decoding process.

A picture previously decoded and stored in a DPB is marked as "used for short-term reference," "used for long-term reference," or "unused for reference." A reference picture marked as a picture not to be used as a reference picture is no longer used as a reference picture during an prediction process and may be deleted from a DPB. According to an exemplary embodiment, RPS information may be signaled for each slice of each picture. For example, RPS information may be included in the header of the first slice of each picture and signaled. The reason of transmitting RPS information for each slice of each picture is to secure error robustness. Furthermore, according to an exemplary embodiment, RPS information may include information regarding reference pictures used by a current picture and pictures decoded after the current picture.

Figure 23:
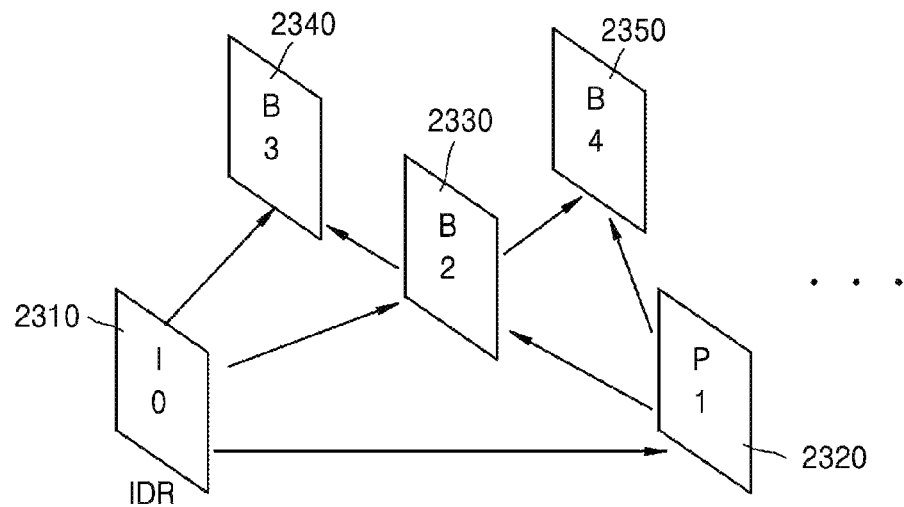
FIG. 23 is a diagram showing a coding structure for describing an RPS according to an exemplary embodiment.

FIG. 23 is a diagram showing a coding structure for describing a RPS according to an exemplary embodiment.

FIG. 23 shows referring relationships between pictures. The arrows indicate referring directions. In other words, it is shown that a picture I0 2310 is used as a reference picture for a picture P1 2320, a picture B2 2330, and a picture B3 2340. Numbers allocated pictures I, B, and P indicate a decoding sequence. In other words, the picture I0 2310, the picture P1 2320, the picture B2 2330, the picture B3 2340, and a picture B4 2350 are decoded in the order stated. Furthermore, the order that the respective pictures are arranged means an outputting sequence. In other words, the picture I0 2310, the picture B3 2340, the picture B2 2330, the picture B4 2350, and the picture P1 2320 are output in the order stated.

Table 2 shows an example of RPS information corresponding to a coding structure having the referring relationship shown in FIG. 23.

TABLE 2

| Picture | RPS {reference picture, used by current picture} |
|---|---|
| I0 | — |
| P1 | {I0, 1} |
| B2 | {I0, 1}, {P1, 1} |
| B3 | {I0, 1}, {P1, 0}, {B2, 1} |
| B4 | {P1, 1}, {B2, 1} |

Referring to Table 2, RPS information may include {reference picture, used by current picture}, for example. The "reference picture" refers to a picture that is previously decoded and stored in a DPB before a current picture based on a decoding sequence and is used as a reference picture for the current picture or pictures after the current picture. The "used by current picture" is a flag indicating whether a picture stored in DPB is used as a reference picture for the current picture or a reference picture for pictures decoded after the current picture. In other words, if value of the flag "used by current picture" is 1, the flag indicates that a corresponding picture is referred by the current picture. If value of the flag "used by current picture" is 0, the flag indicates that a corresponding picture is used as a reference picture for pictures decoded after the current picture.

Referring to FIG. 23, the picture I0 2310 is an IDR picture that is firstly decoded. Because there is no picture decoded before the IDR picture in a decoding sequence, RPS information regarding the picture I0 2310, which is the IDR picture, is not signaled. The picture P1 2320, which is secondly decoded, uses the picture I0 2310 as a reference picture. Therefore, RPS information included in the slice header of the picture P1 2320 includes RPS information {I0, 1} indicating whether the previously decoded picture I0 is used as a reference picture for the picture P1 2320 or pictures decoded after the picture P1 2320. Similarly, the picture B2 2330 decoded in sequence uses both the picture I0 2310 and the picture P1 2320 that are previously decoded and stored in a DPB as reference pictures, RPS information regarding the picture B2 2330 includes {I0, 1} and {P1, 1}.

Because the picture B3 2340 decoded in sequence is predicted with reference to the picture I0 2310 and the picture B2 2330, RPS information regarding the picture B3 2340 includes {I0, 1} and {B2, 1}. The picture P1 2320 is not used as a reference picture for the picture B3 2340, but is used as a reference picture for the picture B4 2350, which is a picture decoded after the picture B3 2340. Therefore, RPS information regarding the picture B3 2340 includes {P1, 0}. In other words, if RPS information included in the slice header of the picture B3 2340 includes {P1, 0}, the picture P1 2320 is not used as a reference picture for the picture B3 2340 currently being decoded, but is used as a reference picture for pictures decoded after the picture B3 2340.

The picture B4 2350 decoded in sequence uses the picture B2 2330 and the picture P1 2320 as reference pictures. Therefore, RPS information regarding the picture B4 2350 includes {P1, 1} and {B2, 1}.

When respective pictures are decoded according to a decoding sequence, reference status of pictures that are previously decoded and stored in a DPB may be changed based on RPS information regarding the respective pictures. For example, RPS information regarding the picture B4 2350 does not include the picture I0 2310. Therefore, it may be determined that the picture B4 2350 and pictures decoded after the picture B4 2350 no longer use the picture I0 2310 as a reference picture, and the picture I0 2310 is marked as a picture not to be used as a reference picture.

Meanwhile, according to an exemplary embodiment, RPS information included in the slice header of each picture is decoded before a current picture is decoded.

Figure 24:
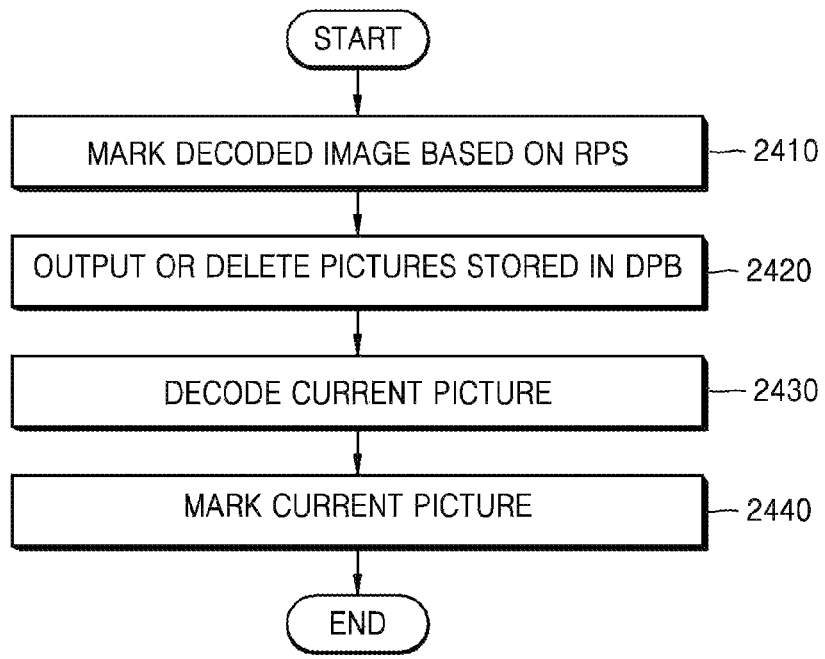
FIG. 24 is a flowchart showing decoding of RPS information and decoding of a current image, according to an exemplary embodiment.

FIG. 24 is a flowchart showing decoding of RPS information and decoding of a current image, according to an exemplary embodiment.

Referring to FIG. 24, in an operation 2410, a decoded picture stored in a DPB is marked based on RPS information regarding a current image. If RPS information is not available or a picture is initially decoded and stored in a DPB, the corresponding picture is marked as a short-term reference picture.

In an operation 2420, pictures stored in the DPB are output or deleted from the DPB based on RPS information regarding the current picture.

The current picture is decoded in an operation 2430 and the decoded current image is stored in the DPB in an operation 2440, where the decoded current picture stored in the DPB is marked as a short-term reference picture. Reference picture status of the current picture, which is marked as a short-term reference picture, is changed based on RPS information regarding pictures decoded after the current picture.

As described above, according to an exemplary embodiment, RPS information is decoded before a current picture is decoded, reference pictures stored in a DPB are organized based on RPS information, and the current picture is decoded by using the organized reference pictures in the DPB.

As described above, RPS information is included in the slice header of each picture and signaled. However, because there is no picture decoded before an IDR picture in a decoding sequence, RPS information is not signaled with respect to the IDR picture. However, RPS information may be transmitted with respect to a slice I of a RAP picture other than the IDR picture, because it may be allowed for a picture decoded after a picture I in a decoding sequence to refer to a picture decoded before the picture I.

Each of pictures included in RPS information may be identified by POC information indicating an outputting sequence. POC of a picture included in RPS information may be signaled by using pic_order_cnt_lsb indicating least significant bit (LSB) of all of POC values.

Information regarding reference pictures included in RPS information according to an exemplary embodiment may be categorized into six subsets including first short-term RPS information (RefPicSetStCurrBefore), second short-term RPS information (RefPicSetStCurrAfter), third short-term RPS information (RefPicSetStFoll), first long-term RPS information (RefPicSetLtCurr), second long-term RPS information (RefPicSetLtFoll), and interlayer RPS information (RefPicSetIvCurr).

The first short-term RPS information (RefPicSetStCurrBefore) include information regarding short-term reference pictures that are included in a same layer as a current picture, precede the current picture in both decoding sequence and outputting sequence, and may be used as reference pictures for the current picture.

The second short-term RPS information (RefPicSetStCurrAfter) include information regarding short-term reference pictures that are included in the same layer as the current picture, precedes the current picture in the decoding sequence, follows the current picture in the outputting sequence, and may be used as reference pictures for the current picture. The third short-term RPS information (RefPicSetStFoll) includes information regarding short-term reference pictures that are included in the same layer as the current picture, may be referred by pictures following the current picture in the decoding sequence, and are not used as reference pictures for the current picture.

The first long-term RPS information (RefPicSetLtCurr) includes information regarding a long-term reference picture that is included in the same layer as the current picture and may be used as a reference picture for the current picture. The second long-term RPS information (RefPicSetLtFoll) includes information regarding a long-term reference picture included in the same layer as the current picture, may be referred by pictures following the current picture in the decoding sequence, and is not used as a reference picture for the current picture.

The interlayer RPS information (RefPicSetIvCurr) includes information regarding a reference picture having a same POC as the current picture, belongs to a layer different from that of the current picture, and may be used as a reference picture for the current picture.

As described above, the DPB controller 1630 marks a picture stored in the DPB 1620 as a short-term reference picture, a long-term reference picture or a picture not to be used as a reference picture. The DPB controller 1630 may determine whether a picture stored in the DPB 1620 is used as a reference picture for a current picture based on the first short-term RPS information (RefPicSetStCurrBefore), the second short-term RPS information (RefPicSetStCurrAfter), the third short-term RPS information (RefPicSetStFoll), the first long-term RPS information (RefPicSetLtCurr), and the second long-term RPS information (RefPicSetLtFoll). If a picture stored in the DPB 1620 is included in one from among the first short-term RPS information (RefPicSetStCurrBefore), the second short-term RPS information (RefPicSetStCurrAfter), the first long-term RPS information (RefPicSetLtCurr), and the interlayer RPS information (RefPicSetIvCurr), it is determined that the picture stored in the DPB 1620 is used as a reference picture for the current picture. If the image stored in the DPB 1620 is included in one from between the third short-term RPS information (RefPicSetStFoll) and the second long-term RPS information (RefPicSetLtFoll), the picture stored in the DPB 1620 is not used as a reference picture for the current picture and may be used as a reference picture for pictures decoded after the current picture.

Figure 25:
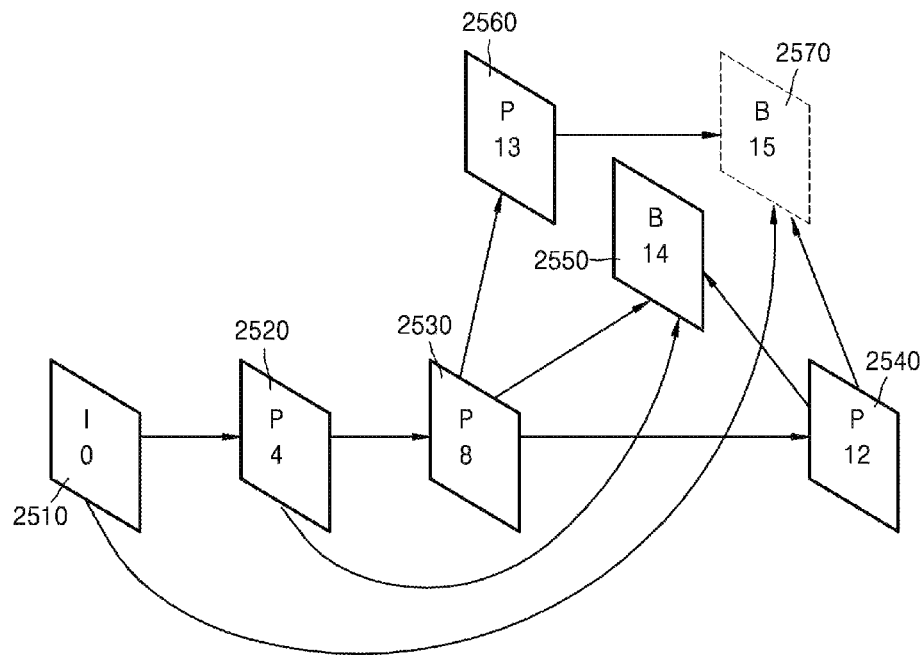
FIG. 25 is a diagram for describing RPS subsets other than interlayer RPS information, according to an exemplary embodiment.

FIG. 25 is a diagram for describing RPS subsets other than interlayer RPS information, according to an exemplary embodiment.

In FIG. 25, it is assumed that a current picture is a picture B14 2550, the arrows indicate referring directions, and only a picture I0 2510 and a picture P4 2520 from among pictures decoded before the picture B14 2550 is decoded are marked as long-term reference pictures. Furthermore, the order that the respective pictures are arranged indicates an outputting sequence, whereas the numbers allocated to the respective pictures indicate a decoding sequence.

When the picture B14 2550 is decoded, a picture P8 2530 is referred by the picture B14 2550. Because the picture P8 2530 precedes the picture B14 2550 in both decoding sequence and outputting sequence, first short-term RPS information (RefPicSetStCurrBefore) of the picture B14 2550 includes the picture P8 2530. A picture P12 2540 is referred by the picture B14 2550, precedes the picture B14 2550 in decoding sequence, but follows the picture B14 2550 in outputting sequence. Therefore, second short-term RPS information (RefPicSetStCurrAfter) of the picture B14 2550 includes the picture P12 2540. Although a picture P13 2560 is not referred by the picture B14 2550, the picture P13 2560 is referenced by a picture B15 2570 decoded after the picture B14 2550. Therefore, third short-term RPS information (RefPicSetStFoll) of the picture B14 2550 includes the picture P13 2560.

The picture P4 2520 is a long-term reference picture and is used as a reference picture for the picture B14 2550. Therefore, first long-term RPS information (RefPicSetLtCurr) of the picture B14 2550 includes the picture P4 2520. The picture I0 2510 is a long-term reference picture and is not used as a reference picture for the picture B14 2550. However, the picture I0 2510 is used as a reference picture for the picture B15 2570 decoded after the picture B14 2550. Therefore, second long-term RPS information (RefPicSetLtFoll) of the picture B14 2550 includes the picture I0 2510.

As described above, RPS information according to an exemplary embodiment includes not only five subsets obtained based on a same layer, but also interlayer RPS information (RefPicSetIvCurr) regarding pictures used as reference pictures for interlayer prediction.

Figure 26:
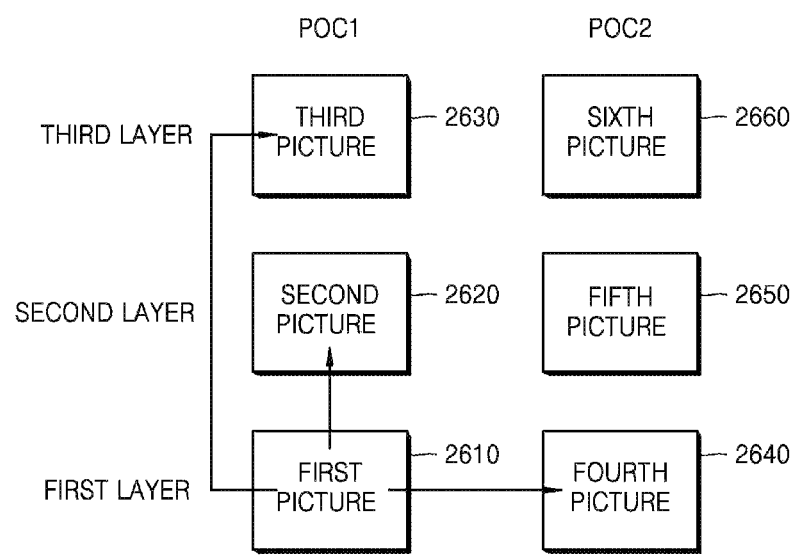
FIG. 26 is a diagram for describing interlayer RPS information.

FIG. 26 is a diagram for describing interlayer RPS information.

Referring to FIG. 26, it is assumed that a first picture 2610 of a first layer is decoded for the first time, marked as a short-term reference picture, and stored in a DPB. As shown in FIG. 26, the first picture 2610 of the first layer is a reference picture for a second picture 2620 of a second layer, a third picture 2630 of a third layer, and a fourth picture 2640 of a same layer having a different POC. In this case, interlayer RPS information regarding the second picture 2620 of the second layer and the third picture 2630 of the third layer may include the first layer as layer information regarding a reference picture to be referred during interlayer prediction.

Therefore, when the second picture 2620 of the second layer is decoded, the DPB controller 1630 may determine that the first picture 2610 is used as a reference picture for interlayer prediction of the second picture 2620, based on the interlayer RPS information regarding the second picture 2620. As described above, the first picture 2610 used as a reference picture for interlayer prediction is marked from a short-term reference picture as a long-term reference picture in consideration of an error that may occur during acquisition of a predicted motion vector.

The first picture 2610 marked as a long-term reference picture may be marked as a short-term reference picture after the second picture 2620 of the second layer is decoded. Next, when the third picture 2630 is decoded, interlayer RPS information regarding the third picture 2630 may be obtained. Based on interlayer RPS information regarding the third picture 2630, the DPB controller 1630 may determine that the first picture 2610 of the first layer is used as a reference picture for interlayer prediction of the third picture 2630. As described above, the first picture 2610 used as a reference picture for interlayer prediction is marked from a short-term reference picture as a long-term reference picture in consideration of an error that may occur during acquisition of a predicted motion vector. Because the third picture 2630 and the first picture 2610 have a same POC value, an error may occur during acquisition of a predicted motion vector, and thus the first picture 2610 may be marked as a long-term reference picture again. The first picture 2610 marked as a long-term reference picture may be marked as a short-term reference picture again after the third picture 2630 of the third layer is decoded.

The first picture 2610 of the first layer may be marked as a long-term reference picture by default after being decoded and stored in the DPB 1620. The first picture 2610 marked as a long-term reference picture may be referred for interlayer predictions while the second picture 2620 and the third picture 2630 having a same POC value are encoded. According to another embodiment, a process of marking the first picture 2610 as a long-term reference picture and a process of marking the first picture 2610 as a short-term reference picture after the second picture 2620 or the third picture 2630 is decoded may not be repeated. The first picture 2610 may be marked as a long-term reference picture until pictures that are interlayer predicted with reference to the first picture 2610 and have a same POC value are decoded. Reference picture status of the first picture 2610 may be updated based on RPS information regarding a picture that has a different POC value and is included in a next AU. The picture that has a different POC value and is included in the next AU may be the fourth picture 2640 on the same layer as the first picture 2610.

Reference picture status of the first picture 2610, which is marked as a long-term reference picture or a short-term reference picture after being used as a reference picture for interlayer prediction, is updated based on RPS information regarding the fourth picture 2640, which is on the same first layer and has a different POC. In case of FIG. 26, the fourth picture 2640 refers the first picture 2610, and thus reference picture status of the first picture 2610 may be marked as a short-term reference picture or a long-term reference picture based on RPS information regarding the fourth picture 2640. If the fourth picture 2640 does not refer to the first picture 2610 and the first picture 2610 is no longer referred by fifth and sixth pictures 2650 and 2660 decoded after the fourth picture 2640, reference picture status of the first picture 2610 is updated as a picture not to be used as a reference picture.

Figure 27:
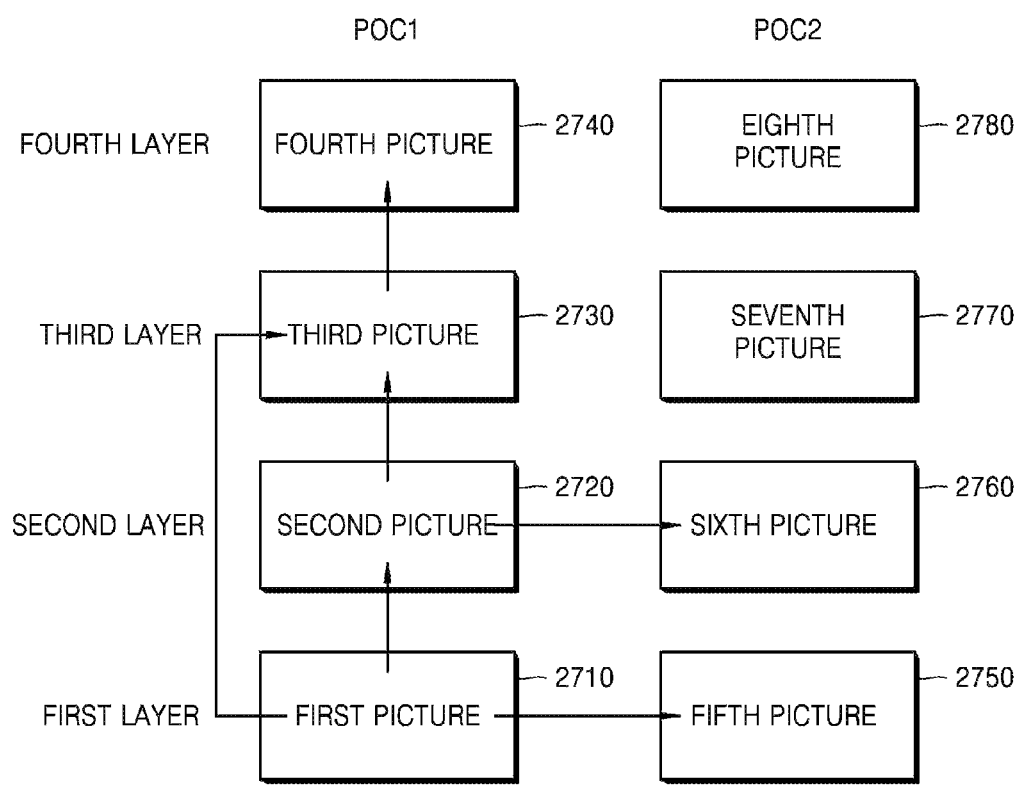
FIG. 27 is a diagram for describing an example of performing interlayer prediction, according to an exemplary embodiment.

FIG. 27 is a diagram for describing an example of performing interlayer prediction, according to an exemplary embodiment.

Referring to FIG. 27, it is assumed that a first picture 2710 of a first layer is decoded for the first time, marked as a short-term reference picture, and stored in a DPB. As shown in FIG. 27, the first picture 2710 of the first layer is a reference picture for a second picture 2720 of a second layer, a third picture 2730 of a third layer, and a fifth picture 2750 of a same layer having a different POC. In this case, interlayer RPS information regarding the second picture 2720 of the second layer and the third picture 2730 of the third layer may include information of the first layer as layer information regarding a reference picture to be referred during interlayer prediction.

Therefore, when the second picture 2720 of the second layer is decoded, the DPB controller 1630 may determine, based on the interlayer RPS information regarding the second picture 2720, that the first picture 2710 is used as a reference picture for interlayer prediction of the second picture 2720. As described above, the first picture 2710 used as a reference picture for interlayer prediction is marked from a short-term reference picture as a long-term reference picture in consideration of an error that may occur during acquisition of a predicted motion vector.

When the third picture 2730 of the third layer is decoded after the second picture 2720 of the second layer is decoded, the DPB controller 1630 may determine, based on the interlayer RPS information regarding the third picture 2730, that the first picture 2710 of the first layer is used as a reference picture for interlayer prediction of the third picture 2730. Therefore, the video decoder 1610 may interlayer predict the third picture 2730 with reference to the first picture 2710 while decoding the third picture 2730.

Alternatively, after the first picture 2710 is decoded and before the second picture 2720 and the third picture 2730 are decoded, the DPB controller 1630 may determine whether the first picture 2710 is used as a reference picture for pictures of other layers and mark the first picture 2710. In detail, the DPB controller 1630 may mark the first picture 2710 as a short-term reference picture, a long-term reference picture, or a picture not to be used as a reference picture based on a flag indicating whether the first picture 2710 is used as a reference picture for pictures of other layers.

If it is determined that the first picture 2710 is to be used as a reference picture for interlayer prediction of pictures of other layers based on a flag value, the DPB controller 1630 may mark the decoded first picture 2710 as a long-term reference picture. The first picture 2710 marked as a long-term reference picture may be used as a reference picture when the second picture 2720 and the third picture 2730 are interlayer predicted. Therefore, occurrence of an error during interlayer predictions of the second picture 2720 and the third picture 2730 with reference to the first picture 2710 may be prevented.

On the contrary, if it is determined that the first picture 2710 is not to be used as a reference picture for interlayer prediction of pictures of other layers based on a flag value, the DPB controller 1630 may mark the decoded first picture 2710 as a short-term reference picture or a picture not to be used as a reference picture.

The video decoder 1610 may perform interlayer prediction decoding with respect to the second picture 2720 and the third picture 2730 with reference to the first picture 2710 marked as a long-term reference picture. The second picture 2720 and the third picture 2730 decoded with reference to the first picture 2710 are stored in a DPB by the DPB controller 1630 and may be marked as short-term reference pictures. Alternatively, based on a flag indicating whether the second picture 2720 and the third picture 2730 are to be used as reference pictures for interlayer prediction, each of the second picture 2720 and the third picture 2730 may be marked as a short-term reference picture, a long-term reference picture, or a picture not to be used as a reference picture. If a flag value is 1, the second picture 2720 or the third picture 2730 may be marked as a long-term reference picture. If the flag value is 0, each of the second picture 2720 or the third picture 2730 may be marked as a short-term reference picture or a picture not to be used as a reference picture. The flag value may be obtained based on whether a TemporalId value of a picture is smaller than a designated reference value.

It is assumed that the third picture 2730 is a reference picture of a fourth picture 2740. In this case, interlayer RPS information regarding the fourth picture 2740 may include information of the third layer as layer information regarding a reference picture to be referred during interlayer prediction.

Therefore, when the fourth picture 2740 is decoded, the DPB controller 1630 may determine that the third picture 2730 is used as a reference picture for interlayer prediction of the fourth picture 2740, based on interlayer RPS information regarding the fourth picture 2740. As described above, the third picture 2730, which is used as a reference picture for interlayer prediction, is marked from a short-term reference picture as a long-term reference picture in consideration of an error that may occur during acquisition of a predicted motion vector. However, if the third picture 2730 is already marked as a long-term reference picture based on a flag value, marking of the third picture 2730 as a long-term reference picture is not applied.

The DPB controller 1630 may determine whether the fourth picture 2740 is used as a reference picture for interlayer prediction of pictures of other layers. The DPB controller 1630 may mark the fourth picture 2740 as a picture not to be used as a reference picture based on a flag indicating whether the fourth picture 2740 is used as a reference picture for interlayer prediction of pictures of other layers and may delete the fourth picture 2740 from the DPB 1620. Referring to FIG. 27, the fourth picture 2740 is not used as a reference picture for interlayer prediction of pictures of other layers. Therefore, the DPB controller 1630 may determine that the fourth picture 2740 is not used as a reference picture for interlayer prediction of pictures of other layers based on information obtained with respect to the fourth picture 2740. The DPB controller 1630 may mark the fourth picture 2740 as a picture not to be used as a reference picture and delete the fourth picture 2740 from the DPB 1620. Because the fourth picture 2740 may be immediately deleted from the DPB 1620 based on a flag value indicating whether the fourth picture 2740 is used as a reference picture after being decoded, capacity of the DPB 1620 may be minimized.

If all encoded pictures in a current AU are decoded, the DPB controller 1630 may mark the first picture 2710, the second picture 2720, and the third picture 2730 as short-term reference pictures.

Hereinafter, an example of completing decoding in a current AU and marking reference pictures for performing decoding in a next AU will be described with reference to FIG. 27.

Reference picture status of the first picture 2710 marked as a short-term reference picture is updated based on RPS information regarding the fifth picture 2750 that is on the same first layer and has a different POC. The fifth picture 2750 having a different POC from that of the first picture 2710 belongs to a different AU from that of the first picture 2710. In case of FIG. 27, the fifth picture 2750 refers the first picture 2710, reference picture status of the first picture 2710 may be marked as a short-term reference picture or a long-term reference picture based on RPS information regarding the fifth picture 2750. If the fifth picture 2750 does not refer to the first picture 2710 and the first picture 2710 is no longer referred to by other pictures 2760, 2770, and 2780 decoded after the fifth picture 2750, reference picture status of the first picture 2710 is updated to a picture not to be used as a reference picture.

A reference picture status of the second picture 2720 marked as a short-term reference picture is updated based on RPS information regarding a sixth picture 2760 that is on the same second layer and has a different POC. In the case of FIG. 27, the sixth picture 2760 refers to the second picture 2720, reference picture status of the second picture 2720 may be marked as a short-term reference picture or a long-term reference picture based on RPS information regarding the sixth picture 2760. If the sixth picture 2760 does not refer the second picture 2720 and the second picture 2720 is no longer referred to by other seventh and eighth pictures 2770 and 2780 decoded after the sixth picture 2760, a reference picture status of the second picture 2720 is updated to a picture not to be used as a reference picture.

The third picture 2730 and the fourth picture 2740, which are marked as short-term reference pictures, are no longer referred to in a next AU corresponding to POC2 value, and thus, a reference picture status each of the third picture 2730 and the fourth picture 2740 may be updated as a picture not to be used as a reference picture.

FIG. 28 shows an example of codes for performing interlayer prediction, according to an exemplary embodiment.

Referring to codes 2810 for updating pictures referred to for interlayer prediction, pictures RefPicSetInterLayer having a same POC as a current picture and a reference layer ID RefLayerId a layer ID nuh_layer_id identical to each other may be marked as long-term reference pictures. The pictures having a same POC as a current picture and a reference layer ID RefLayerId a layer ID nuh_layer_id identical to each other may be pictures RefPicSetInterLayer referred to for interlayer prediction of a current picture. In other words, pictures used as reference pictures for interlayer prediction of a current picture may be marked as long-term reference pictures.

Furthermore, if a picture having layer ID nuh_layer_id greater than 0 is decoded (2820), a picture RefPicSetInterLayer referred to for interlayer prediction of the decoded picture may be marked as a short-term reference picture (2830). In other words, if a picture of a layer, which is not the base layer, is decoded via interlayer prediction, a picture used for the interlayer prediction may be marked as a short-term reference picture.

FIG. 29 shows an example of codes for performing interlayer prediction, according to an exemplary embodiment.

Referring to codes 2910, pictures stored in a DPB based on RPS information included in the first slices of the pictures may be marked as pictures not to be used as reference pictures or short-term reference pictures.

Referring to codes 2920, after all slices of a current picture are decoded, a decoded picture may be marked as a long-term reference picture.

In other words, when a picture is decoded, the decoded picture may be marked as a long-term reference picture by default and interlayer prediction may be performed, and thus, pictures included in a current AU may be decoded. Furthermore, if a picture on a same layer as a picture marked as a long-term reference picture is decoded, the picture marked as a long-term reference picture may be marked based on RPS information regarding the picture on the same layer that is being decoded.

FIG. 30 shows an example of codes for performing interlayer prediction based on interlayer RPS information, according to an exemplary embodiment.

If all pictures having layer IDs nuh_layer_id greater than 0 in a current AU are decoded (2820), a picture, which has a same POC value, has a layer ID identical to a layer ID in a current AU, and is marked as a long-term reference picture, is marked as a short-term reference picture (3020).

In other words, if all pictures corresponding to a layer that is not the base layer are decoded, a picture marked as a long-term reference picture may be marked as a short-term reference picture and reference picture status of the picture may be updated based on RPS information regarding a picture include in a next AU.

FIG. 31 shows an example of codes for performing interlayer prediction based on an interlayer prediction flag, according to an exemplary embodiment.

Referring to codes 3110, after a current picture is decoded, the decoded current picture may be marked as a long-term reference picture if value of InterlayerPredictionFlag regarding the decoded current picture is 1 or may be marked as a short-term reference picture if value of InterlayerPredictionFlag regarding the decoded current picture is 0. If value of InterlayerPredictionFlag regarding the decoded current picture is 1, the decoded current picture may be used as a reference picture for interlayer prediction of pictures of other layers, and thus, the decoded current picture may be marked as a long-term reference picture to perform interlayer prediction.

Furthermore, if all pictures having layer IDs nuh_layer_id greater than 0 are decoded (3120), a picture having a same POC value and InterlayerPredictionFlag value of 1 may be marked as a short-term reference picture (3130). In other words, if all pictures corresponding to a non-based layer are decoded, a picture used as a reference picture for interlayer prediction may be marked as a short-term reference picture and a reference picture status of the picture may be updated based on RPS information regarding a picture included in a same AU.

FIG. 32 shows an example of codes for obtaining an interlayer prediction flag, according to an exemplary embodiment.

Referring to syntax 3210, value of max_sublayer_for_il-p_plus1[i] may be obtained for each of layers.

Referring to codes 3220, if value of TemporalId of each layer is smaller than max_sublayer_for_ilp_plus1 [i]−1, the InterlayerPredictionFlag may have value of 1. If the value of TemporalId of each layer is greater than max_sublayer_for_ilp_plus1[i]−1, the InterlayerPredictionFlag may have value of 0. In other words, it may be determined whether pictures of each layer are used as reference pictures for interlayer prediction of pictures of other layers based on TemporalId values of the respectively corresponding layers.

FIG. 33 shows an example of codes for marking pictures based on an interlayer prediction flag, according to an exemplary embodiment.

Referring to codes 3310 and 3320, if value of InterlayerPredictionFlag regarding a picture that has a same POC as a current picture, has a same layer ID as a recently decoded layer, and is not marked as a picture not to be used as a reference picture (3310) is 0, the picture may be marked as a picture not to be used as a reference picture (3320) and deleted from the DPB 1620.

Because a picture having InterlayerPredictionFlag value of 0 is not used as a reference picture during an interlayer prediction, the picture is considered as a picture inappropriate to be referred to by another picture and is marked as a picture not to be used as a reference picture any longer, thereby minimizing a capacity of the DPB 1620.

According to exemplary embodiments, reference relationships between pictures included in a multi-layer video may be efficiently transmitted by reflecting interlayer predictions of the pictures. Furthermore, according to exemplary embodiments, a decoded picture buffer used for decoding a multi-layer video may be efficiently managed.

The encoding and decoding of the exemplary embodiments can also be embodied as computer readable codes on a computer readable recording medium (the term computer includes all devices capable of processing data). The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the exemplary embodiments have been particularly shown and described with reference to the drawings, it will be understood that various changes in form and details may be made therein without departing from the spirit and scope of the following claims.

The invention claimed is:

1. A method of decoding multi-layer video, the method comprising:
    decoding a picture of a first layer, storing the decoded picture of the first layer in a decoded picture buffer (DPB);
    obtaining, from a bitstream, information indicating a value about a maximum temporal identifier when a value of the information is greater than 0 or the picture of the first layer is not used as a reference picture for interlayer prediction when a value of the information is equal to 0,
    wherein a value about a temporal identifier of the picture of the first layer is smaller than or equal to the value about the maximum temporal identifier,
    marking the first layer picture based on the obtained information to indicate whether the picture of the first layer, of which the value about a temporal identifier is smaller than or equal to the value about the maximum temporal identifier, is used as a reference picture for interlayer prediction.

2. The method of claim 1, wherein the marking of the picture of the first layer comprises marking the picture of the first layer as a long-term reference picture if the picture of the first layer is used as a reference picture for interlayer prediction.

3. The method of claim 2, further comprising:
    if the picture of the first layer is used as a reference picture for interlayer prediction:
    performing interlayer prediction with respect to a picture of a second layer with reference to the picture of the first layer; and
    decoding the picture of the second layer based on a result of performing the interlayer prediction.

4. The method of claim 2, further comprising marking the picture of the first layer, which is marked as the long-term reference picture, as a short-term reference picture after at least one from among encoded pictures of layers of a current access unit is decoded.

5. The method of claim 1, wherein the marking of the picture of the first layer comprises, if the picture of the first layer is not used as a reference picture for interlayer prediction of pictures of other layers having a first picture order count (POC) value, marking the picture of the first layer as a short-term reference picture.

6. The method of claim 1, wherein the obtaining comprises obtaining information indicating whether the picture of the first layer is used as a reference picture for interlayer prediction of pictures of other layers having a first picture order count (POC) value based on at least one from between picture quality and temporal hierarchical information regarding the picture of the first layer.

7. The method of claim 6, wherein the marking of the first layer picture comprises, if the picture of the first layer is not used as a reference picture for interlayer prediction of pictures of other layers having the first POC value, marking the picture of the first layer as a picture not to be used as a reference picture.

8. A multi-layer video decoding apparatus comprising:
    a decoded picture buffer configured to store decoded pictures;
    a parser configured to obtain, from a bitstream, information indicating a value about a maximum temporal identifier when a value of the information is greater than 0 or the picture of the first layer is not used as a reference picture for interlayer prediction when a value of the information is equal to 0, wherein a value about a temporal identifier of the picture of the first layer is smaller than or equal to the value about the maximum temporal identifier,
    a decoded picture buffer configured to store the picture of the first layer in the decoded picture buffer and mark the picture of the first layer based on the obtained information to indicate whether the picture of the first layer, of which the value about a temporal identifier is smaller than or equal to the value about the maximum temporal identifier, is used as a reference picture for interlayer prediction; and a video decoder configured to decode pictures included in multi-layers.

9. The multi-layer video decoding apparatus of claim 8, wherein the parser is further configured to obtain information indicating whether the picture of the first layer is used as a reference picture for interlayer prediction based on at least one from between picture quality and temporal hierarchical information regarding the picture of the first layer.

* * * * *